United States Patent
Matsumoto et al.

[11] Patent Number: 5,976,056
[45] Date of Patent: Nov. 2, 1999

[54] CONTROL APPARATUS FOR A VEHICLE

[75] Inventors: Takuya Matsumoto, Okazaki; Katsutoshi Usuki; Toru Hashimoto, both of Toyoake; Masakazu Kinoshita, Anjo; Mitsuhiro Miyake, Kyoto; Seiichi Inoue, Okazaki, all of Japan

[73] Assignee: Mitsubishi Jidosha Kogyo Kabushiki Kaisha, Tokyo, Japan

[21] Appl. No.: 09/064,876

[22] Filed: Apr. 23, 1998

[30] Foreign Application Priority Data

Apr. 25, 1997 [JP] Japan .................................. 9-123428

[51] Int. Cl.⁶ .................................................. F16H 61/12
[52] U.S. Cl. ............................................ 477/125; 477/906
[58] Field of Search ..................................... 477/125, 906

[56] References Cited

U.S. PATENT DOCUMENTS

| | | | |
|---|---|---|---|
| 4,975,844 | 12/1990 | Holbrook et al. | 477/906 |
| 5,056,022 | 10/1991 | Witowski et al. | 477/906 |
| 5,117,711 | 6/1992 | Iizuka | 477/906 |
| 5,366,424 | 11/1994 | Wataya | 477/906 |
| 5,439,426 | 8/1995 | Nakashima | 477/125 |
| 5,562,570 | 10/1996 | Nakashima | 477/906 |
| 5,681,240 | 10/1997 | Sunada et al. | 477/125 |

FOREIGN PATENT DOCUMENTS 2-195070  8/1990  Japan .
6-249332  9/1994  Japan .

Primary Examiner—Dirk Wright

[57] ABSTRACT

The present invention relates to a control apparatus for a vehicle equipped with an electronic throttle control unit (drive by wire) as electronic throttle control means and an automatic transmission, and the object of the invention is to provide a control apparatus for a vehicle which is capable of ensuring stable travel even in the case where a throttle valve is stuck by a failure of an electronic throttle control unit. In a control apparatus for a vehicle equipped with electronic throttle control means for electrically driving a throttle valve by drive means and an automatic transmission having a plurality of speed change gear stages, the control apparatus is provided with sticking judgment means for judging whether or not the throttle valve has been stuck, and speed change regulation means for inhibiting use of a predetermined gear stage among the speed change gear stages of the automatic transmission in the case where the throttle valve is judged to have been stuck by the sticking judgment means.

21 Claims, 6 Drawing Sheets

CONTROL APPARATUS FOR A VEHICLE

BACKGROUND OF THE INVENTION

1. Field of the Invention

The present invention relates to a control apparatus for a vehicle equipped with an electronic throttle control unit (also called a drive by wire) and an automatic transmission, and more particularly to a vehicle control apparatus adapted to be employed when the electronic throttle control unit has failed.

2. Description of Related Art

In engines such as automobile engines, a drive by wire (hereinafter referred to as a DBW) connecting an accel pedal and a throttle valve together by an electrical signal has hitherto been developed. In a DBW such as this, the accel pedal and the throttle valve are not mechanically connected, and based on a variety of parameters in addition to an operational quantity of the accel pedal (accel opening angle), a virtual accel opening angle ("pseudo" accel opening angle) is set by a computer. In correspondence with this, the throttle valve can be controlled, and the DBW is also referred to as an electronic throttle control unit.

Therefore, for example, during idling where the accel pedal has not been operated (i.e., the accel opening angle is less than a small predetermined value), idling engine speed can be controlled, while the throttle valve is being adjusted finely. Also, in accordance with the traveling state of the vehicle and the operating state of the engine, the accel opening angle (driver's operation) is corrected in order to set a pseudo accel opening angle. With the control of the throttle valve based on this, engine running with a feeling of smoothness is realizable.

On the other hand, a spark ignition type in-cylinder injection internal combustion engine (hereinafter referred to as an engine), which is an internal combustion engine igniting sparks by spark plugs (generally, a gasoline engine) and injects fuel directly into cylinders, has been put to practical use in recent years. In such an engine, an enhancement in the engine fuel consumption performance and an enhancement in the output performance are compatible with each other by making use of the characteristic that fuel injection timing can be freely performed and also the formed state of an air-fuel mixture can be freely controlled.

In other words, in this spark ignition type in-cylinder injection engine, fuel is injected on the compression stroke, and with this, an operation in a state in which fuel is extremely lean (i.e., a super-lean combustion operation in which an air-fuel ratio is extremely higher than a stoichiometric air-fuel ratio) can be performed by stratified-charge combustion. The engine is provided with a super lean operating mode (compression stroke injection mode or lean compression operating mode) as the combustion form and can realize a considerable enhancement in the fuel consumption ratio.

Of course, the spark ignition type in-cylinder injection engine can also perform a premixed combustion operation in which fuel is injected primarily on the intake stroke. In this case, fuel is injected directly into the combustion chamber (cylinder), whereby the greater part of fuel injected at each combustion cycle can be burned with reliability within the combustion cycle. The engine, therefore, can also enhance the engine output.

A premixed combustion operation such as this can also set as combustion form a lean operating mode (lean intake operating mode) which performs operation in a fuel-leaned state which is not so lean as the super lean operating mode (i.e., in a state in which an air-fuel ratio is higher than a stoichiometric air-fuel ratio), a stoichiometric operating mode (stoichiometric feedback operating mode) which performs feedback control on the basis of $O_2$-sensor information so that an air-fuel ratio reaches a stoichiometric air-fuel ratio, and an enriched operating mode (open-loop operating mode) which performs operation in a fuel-enriched state (i.e., in a state in which an air-fuel ratio is lower than a stoichiometric air-fuel ratio).

In general, if a requested output to the engine is small, i.e., if the revolution speed of the engine is low and also the engine load is low, the lean compression operating mode will be selected in order to enhance fuel consumption. As the engine revolution speed and the engine load increase further, the lean intake operating mode, the stoichiometric operating mode, and the enriched operating mode are selected in the recited order.

In the case of the supper lean combustion operating mode (lean compression operating mode), incidentally, there is a need to supply more air to the combustion chamber in order to make an air-fuel ratio high. However, in this lean compression operating mode, since operation is performed in an area where engine load is low, i.e., in an area where the stepping-on quantity of the accel pedal (accel opening angle) is small, the opening angle of the throttle valve corresponding to the accel opening angle cannot satisfy a required air-fuel ratio.

Hence, a technique where an electronically controlled valve (air bypass valve) is arranged in an air bypass passage bypassing an intake-air passage equipped with the throttle valve has been developed. In this technique, when intake air is insufficient at the opening angle of the throttle valve corresponding to the accel opening angle, the air bypass valve is opened in correspondence with a required air volume, thereby performing air supply.

Incidentally, applying the aforementioned DBW to the above-mentioned spark ignition type in-cylinder injection engine is also considered. In other words, in the DBW, since the opening angle of the throttle valve can be controlled without corresponding to the accel opening angle, more air than a quantity corresponding to the accel opening angle can be supplied to the combustion chamber. Therefore, for example, in the lean compression operating mode of the spark ignition type in-cylinder injection engine, even if the accel opening angle is small, a necessary quantity of air can be supplied to the combustion chamber.

However, in the case where such a DBW is adopted, it is desirable to prepare a counter plan against an unlikely failure of the DBW as well.

As failure causes of this DBW, it is considered that the throttle valve which is controlled by the DBW is stuck by catching foreign material, such as dust, contained in blow-by gas or exhaust gas recirculated by an exhaust gas recirculation (EGR) system, etc.

For example, if the throttle valve is stuck in a nearly fully opened state, the opening angle of the throttle valve cannot be controlled by the DBW. Consequently, even in the case where the driver does not request engine output, i.e., even in the case where the stepping-on quantity of the accel pedal is small, the engine output torque is not reduced. For this reason, in this case, if a low speed gear stage is selected, the vehicle driving torque will not be reduced and therefore engine output against the driver's intention will be produced, resulting in a problem that stable travel cannot be ensured.

In such a case, if a high speed gear stage is selected, the vehicle driving torque will be considerably reduced and therefore the engine output will be insufficient when the vehicle is started. Likewise, there is a problem that stable travel cannot be ensured.

On the other hand, if the throttle valve is stuck in a nearly fully closed state, the opening angle of the throttle valve cannot be controlled by the DBW. Consequently, even in the case where the driver is requesting engine output, i.e., even in the case where the stepping-on quantity of the accel pedal is great, the engine output torque is not raised. For this reason, in this case, if a high speed gear stage is selected, the vehicle driving torque will be considerably reduced and therefore there will be a problem that stable travel corresponding to the driver's request cannot be ensured.

In Japanese Laid-Open Patent Publication No. HEI 2-195070, there is disclosed a technique which controls the speed change stages of an automatic transmission in the case where the operating state of a throttle valve is judged to be abnormal.

However, this technique is one which adjusts the speed change stage of the automatic transmission to a predetermined speed change stage corresponding to either vehicle speed or engine revolution speed in the case where the operating state of a throttle valve is judged to be abnormal, and no consideration has been given to the failure state of the throttle valve.

Japanese Laid-Open Patent Publication No. HEI 6-249332 discloses a technique which controls the position of the speed change gear stage of the automatic transmission in consideration of the failure state of the throttle valve. In this technique, in order to obtain sufficient driving force when the throttle control unit is in a state which cannot open the throttle valve, the highest stage position of an allowed speed change gear stage is decided based on the acceleration intention of the driver, and from among speed change gear stage positions equal to or less than this highest stage position of the speed change gear, a speed change gear stage position is selected so that the maximum driving force is obtained. However, this technique has taken neither an enhancement in safety nor an ensurance of stable travel into consideration.

SUMMARY OF THE INVENTION

The present invention has been made in view of the above-mentioned problems. An object of the present invention is to provide a control apparatus for a vehicle which is capable of ensuring stable travel even in the case where a throttle valve is stuck by a failure of an electronic throttle control unit as electronic throttle control means.

To achieve this end, in a control apparatus for a vehicle equipped with electronic throttle control means for electrically driving a throttle valve by drive means and an automatic transmission having a plurality of speed change gear stages, the vehicle control apparatus according to the present invention comprises: sticking judgment means for judging whether or not the throttle valve has been stuck; and speed change regulation means for inhibiting use of a predetermined gear stage among the speed change gear stages of the automatic transmission in the case where the throttle valve is judged to have been stuck by the sticking judgment means.

With this constitution, even in the case where the throttle valve is stuck, there is an advantage that stable travel corresponding to a driver's request can be ensured.

In this case it is preferable that the speed change regulation means be constituted so as to inhibit use of a low speed side gear stage among the speed change gear stages of the automatic transmission in the case where the throttle valve is judged to have been stuck by the sticking judgment means.

Also, preferably the low speed side gear stage includes at least the lowest speed change gear stage among the speed change gear stages and is constituted by a plurality of gear stages from the lowest speed change gear stage to a predetermined gear stage toward a high speed side.

Also, it is preferable that the speed change regulation means be constituted so as to inhibit the use of the low speed side gear stage among the speed change gear stages of the automatic transmission in the case where the throttle valve is judged to have been stuck at an opening angle position equal to or greater than a first predetermined opening angle by the sticking judgment means.

With this constitution, a vehicle driving torque is reduced. Therefore, even in the case where the throttle valve is stuck, there is an advantage that stable travel corresponding to a driver's request can be ensured.

Also, it is preferable that the speed change regulation means be constituted so as to inhibit the use of the low speed side gear stage among the speed change gear stages of the automatic transmission in the case where the throttle valve is judged to have been stuck at an opening angle position less than a predetermined opening angle by the sticking judgment means.

Also, it is preferable that the speed change regulation means be constituted so as to inhibit the use of the low speed side gear stage among the speed change gear stages of the automatic transmission in the case where the throttle valve is judged to have been stuck at an opening angle position equal to or less than a second predetermined opening angle smaller than the first predetermined opening angle by the sticking judgment means.

With this constitution, a rise in a vehicle driving torque is prevented. Therefore, even in the case where the throttle valve is stuck, there is an advantage that stable travel corresponding to a driver's request can be ensured.

Also, preferably the speed change regulation means is constituted so that it inhibits use of a high speed side gear stage among the speed change gear stages of the automatic transmission in the case where the throttle valve is judged to have been stuck by the sticking judgment means.

In this case, preferably the high speed side gear stage includes at least the highest speed change gear stage among the speed change gear stages and is constituted by a plurality of gear stages from the highest speed change gear stage to a predetermined gear stage toward a low speed side.

Also, it is preferable that the speed change regulation means be constituted so as to inhibit the use of the high speed side gear stage among the speed change gear stages of the automatic transmission in the case where the throttle valve is judged to have been stuck at an opening angle position equal to or greater than a first predetermined opening angle by the sticking judgment means.

With this constitution, a considerable reduction in a vehicle driving torque is prevented. Therefore, even in the case where the throttle valve is stuck, there is an advantage that stable travel corresponding to a driver's request can be ensured.

Also, it is preferable that the speed change regulation means be constituted so as to inhibit the use of the high speed side gear stage among the speed change gear stages of the automatic transmission in the case where the throttle valve is judged to have been stuck at an opening angle position less than a predetermined opening angle by the sticking judgment means.

Also, it is preferable that the speed change regulation means be constituted so as to inhibit the use of the high speed side gear stage among the speed change gear stages of the automatic transmission in the case where the throttle valve is judged to have been stuck at an opening angle position equal to or less than a second predetermined opening angle smaller than the first predetermined opening angle by the sticking judgment means.

With this constitution, a vehicle driving torque is raised. Therefore, even in the case where the throttle valve is stuck, there is an advantage that stable travel corresponding to a driver's request can be ensured.

The control apparatus for a vehicle according to the present invention may further comprise: automatic transmission control means switchable to both an automatic speed change mode which changes each speed change gear stage of the automatic transmission automatically and a manual speed change mode which selects each speed change gear stage of the automatic transmission manually; wherein the speed change regulation means inhibits the use of the low speed side gear stage in the case where the automatic transmission control means is in the automatic speed change mode and wherein the speed change regulation means also changes a range of the low speed side gear stage toward the low speed side by at least one stage and inhibits use of the changed low speed side gear stage, in the case where the automatic transmission control means is in the manual speed change mode.

With this constitution, the automatic transmission control means can allow the selection of more speed change gear stages when having a manual speed change mode, so there are advantages that a speed change gear stage can be selected by driver's speed change intention, more stable travel can be ensured, and particularly, traveling performance during limp home can be stabilized.

Also, the control apparatus for a vehicle according to the present invention may further comprise: automatic transmission control means switchable to both an automatic speed change mode which changes each speed change gear stage of the automatic transmission automatically and a manual speed change mode which selects each speed change gear stage of the automatic transmission manually; wherein the speed change regulation means inhibits the use of the high speed side gear stage in the case where the automatic transmission control means is in the automatic speed change mode and wherein the speed change regulation means also changes a range of the high speed side gear stage toward the high speed side by at least one stage and inhibits use of the changed high speed side gear stage, in the case where the automatic transmission control means is in the manual speed change mode.

With this constitution, the automatic transmission control means can allow the selection of more speed change gear stages when having a manual speed change mode, so there are advantages that a speed change gear stage can be selected by driver's speed change intention, more stable travel can be ensured, and particularly, traveling performance during limp home can be stabilized.

Also, in a control apparatus for a vehicle equipped with electronic throttle control means for electrically driving a throttle valve by drive means and an automatic transmission having a plurality of speed change gear stages, the vehicle control apparatus according to the present invention comprises: sticking judgment means for judging whether or not the throttle valve has been stuck; and speed change regulation means for selecting an intermediate speed gear stage among the speed change gear stages of the automatic transmission in the case where the throttle valve is judged to have been stuck by the sticking judgment means.

With this constitution, a considerable reduction in a vehicle driving torque is prevented while reducing the vehicle driving torque. Therefore, even in the case where the throttle valve is stuck, there is an advantage that stable travel corresponding to a driver's request can be ensured.

In this case it is preferable that the intermediate speed gear stage be constituted by the gear stages between a low speed side gear stage and a high speed side gear stage. The low speed side gear stage includes at least the lowest speed change gear stage among the speed change gear stages and is constituted by a plurality of gear stages from the lowest speed change gear stage to a predetermined gear stage toward a high speed side. The high speed side gear stage includes at least the highest speed change gear stage among the speed change gear stages and is constituted by a plurality of gear stages from the highest speed change gear stage to a predetermined gear stage toward a low speed side.

Also, it is preferable that the speed change regulation means be constituted so as to select the intermediate speed gear stage among the speed change gear stages of the automatic transmission in the case where the throttle valve is judged to have been stuck at an opening angle position equal to or greater than a first predetermined opening angle by the sticking judgment means.

Also, it is preferable that the speed change regulation means be constituted so as to select the intermediate speed gear stage among the speed change gear stages of the automatic transmission in the case where the throttle valve is judged to have been stuck at an opening angle position less than a predetermined opening angle by the sticking judgment means.

Also, it is preferable that the speed change regulation means be constituted so as to select the intermediate speed gear stage among the speed change gear stages of the automatic transmission in the case where the throttle valve is judged to have been stuck at an opening angle position equal to or less than a second predetermined opening angle smaller than the first predetermined opening angle by the sticking judgment means.

Also, the control apparatus for a vehicle according to the present invention may further comprise: automatic transmission control means switchable to both an automatic speed change mode which changes each speed change gear stage of the automatic transmission automatically and a manual speed change mode which selects each speed change gear stage of the automatic transmission manually; wherein the speed change regulation means selects the intermediate speed gear stage in the case where the automatic transmission control means is in the automatic speed change mode and wherein the speed change regulation means also changes a range of the intermediate speed gear stage toward the high speed side by at least one stage and selects the changed intermediate speed gear stage, in the case where the automatic transmission control means is in the manual speed change mode.

With this constitution, the automatic transmission control means can allow the selection of more speed change gear stages when having a manual speed change mode, so there are advantages that a speed change gear stage can be selected by driver's speed change intention, more stable travel can be ensured, and particularly, traveling performance during limp home can be stabilized.

Also, the control apparatus for a vehicle according to the present invention may further comprise: automatic transmission control means switchable to both an automatic speed change mode which changes each speed change gear stage of the automatic transmission automatically and a manual speed change mode which selects each speed change gear stage of the automatic transmission manually; wherein the speed change regulation means selects the intermediate speed gear stage in the case where the automatic transmission control means is in the automatic speed change mode and wherein the speed change regulation means also changes a range of the intermediate speed gear stage toward the low speed side by at least one stage and selects the changed intermediate speed gear stage, in the case where the automatic transmission control means is in the manual speed change mode.

With this constitution, the automatic transmission control means can allow the selection of more speed change gear stages when having a manual speed change mode, so there are advantages that a speed change gear stage can be selected by driver's speed change intention, more stable travel can be ensured, and particularly, traveling performance during limp home can be stabilized.

Also, the control apparatus for a vehicle according to the present invention may further comprise: automatic transmission control means switchable to both an automatic speed change mode which changes each speed change gear stage of the automatic transmission automatically and a manual speed change mode which selects each speed change gear stage of the automatic transmission manually; wherein the speed change regulation means selects the intermediate speed gear stage in the case where the automatic transmission control means is in the automatic speed change mode and wherein the speed change regulation means also changes a range of the intermediate speed gear stage toward the low speed side and/or the high speed side by at least one stage and selects the changed intermediate speed gear stage, in the case where the automatic transmission control means is in the manual speed change mode.

BRIEF DESCRIPTION OF THE DRAWINGS

The present invention will be described in further detail with reference to the accompanying drawings wherein.

DESCRIPTION OF THE PREFERRED EMBODIMENTS

If a description will hereinafter be made of an embodiment of the present invention, FIGS. 1 through 6 show a control apparatus for a vehicle as an embodiment of the present invention, and the embodiment will be described based on these figures.

Since the control apparatus for a vehicle according to this embodiment is provided in a vehicle equipped with a spark-ignition type in-cylinder injection internal combustion engine (hereinafter also called an in-cylinder injection internal engine), a description will first be made of the constitution of the in-cylinder injection internal combustion engine in reference to FIG. 2.

[General description of an in-cylinder injection internal combustion engine]

Figure 2:
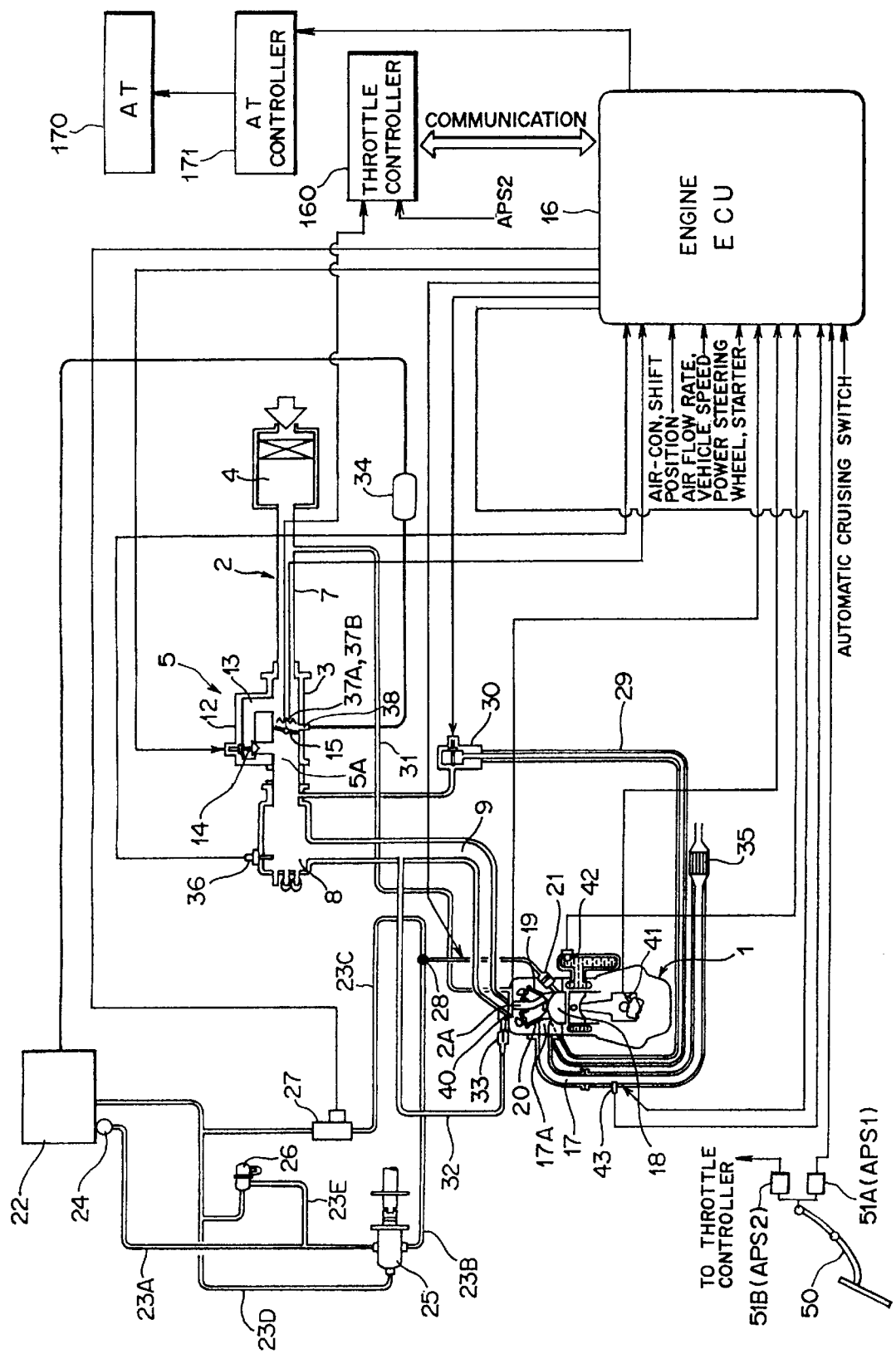
FIG. 2 is a block diagram showing the vehicle control apparatus according to the embodiment of the present invention.

In FIG. 2, 1 is an engine main body, 2 an intake passage, 3 a throttle valve installation portion, and 4 an air cleaner. The intake passage 2 is constituted by an intake pipe 7, a throttle body 5, a surge tank 8, and an intake manifold 9, connected in this order from the upstream side.

The throttle body 5 is equipped with an electronically controlled throttle value (intake air volume regulation means) 15. An opening angle of the electronically controlled throttle value 15 is controlled through a throttle control computer (throttle controller, also called an ETV) 160 to be described later. A target opening angle of the throttle valve (target throttle opening angle) is set according to a stepping-on quantity of an accel pedal 50 (accel opening angle) detected with an accel position sensor (APS1) 51A and an operating state of the engine by an engine control computer (ECU) 16 to be described later.

Figure 1:
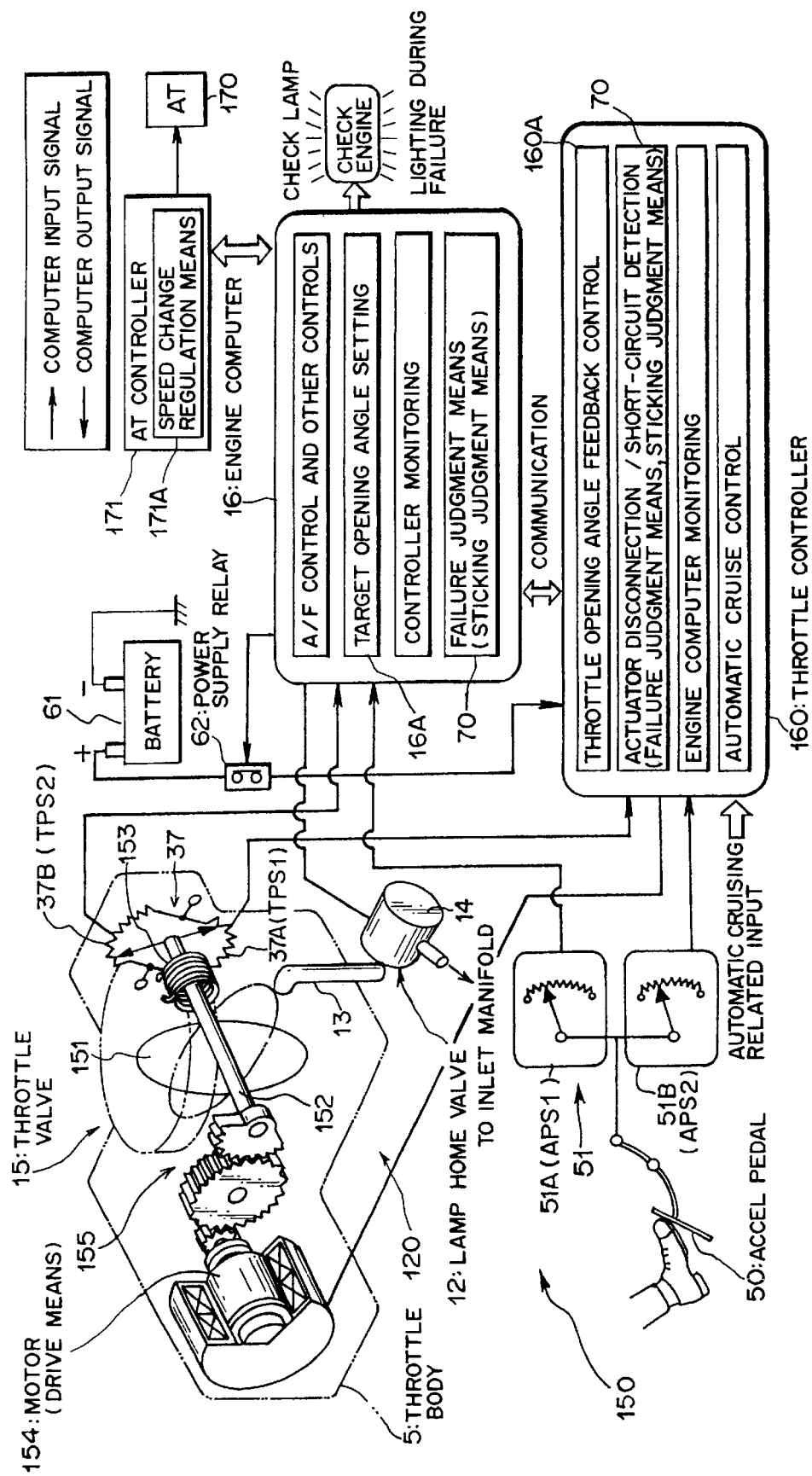
FIG. 1 is a schematic constitution diagram showing the essential parts of a control apparatus for a vehicle according to an embodiment of the present invention.

The electronically controlled throttle value 15, the ECU 16, and the throttle controller 160 constitute an electronic throttle control unit (i.e., a drive by wire (DBW)) 150 which serves as electronic throttle control means (see FIG. 1).

Also, a limp home valve (LHV) 12 is arranged parallel with the electronically controlled throttle value 15. This LHV 12 supplies air so that combustion of the engine is established when the electronically controlled throttle valve 15 has failed (when closed-valve failure has occurred). This failure will be described later. The LHV 12 is constituted by a bypass passage 13 provided on the upstream side of the surge tank 8 so that it bypasses the electronically controlled throttle value 15, and an LHV main body 14 arranged in this bypass passage 13. The LHV main body 14 is driven with a linear solenoid (not shown) which is controlled by the engine control computer (ECU) 16 to be described later.

Also, 17 is an exhaust passage and 18 a combustion chamber. The opening of the intake passage 2 to the combustion chamber 18 and the opening of the exhaust passage 17 to the combustion chamber 18, i.e., an intake port 2A and an exhaust port 17A are provided with an intake valve 19 and an exhaust valve 20, respectively. Furthermore, 21 is a fuel injection valve (injector). In this embodiment, the injector 21 is arranged so as to inject fuel directly into the combustion chamber 18.

In addition, 22 is a fuel tank, 23A through 23E fuel supply paths, 24 a low-pressure fuel pump, 25 a high-pressure fuel pump, 26 a low-pressure regulator, 27 a high-pressure regulator, and 28 a delivery pipe. Fuel within the fuel tank 22 is supplied by the low-pressure fuel pump 24.

Furthermore, the fuel is pressurized with the high-pressure fuel pump 25 and supplied in a predetermined high-pressure state to the injector 21 through the fuel supply paths 23A and 23B and the delivery pipe 28. At this time, the fuel pressure discharged from the low-pressure fuel pump 24 is regulated with the low-pressure regulator 26. The fuel pressure, pressurized with the high-pressure fuel pump 25 and guided to the delivery pipe 28, is regulated with the high-pressure regulator 27.

Additionally, 29 is an exhaust gas recirculation passage (EGR passage) which recirculates a portion of the exhaust gas into the intake passage 2. 30 is an EGR valve (exhaust gas volume regulation means), which regulates the recirculation volume of the exhaust gas that is recirculated into the intake passage 2 through the EGR passage 29. 32 is a passage for restoring blow-by gas, 33 a valve for positively ventilating the crank chamber, 34 a canister, and 35 a catalyzer for purifying exhaust gas (here, catalytic converter rhodium (CCRO)).

Incidentally, as shown in FIG. 2, the ECU 16 performs the control of the LHV 12 in accordance with an operating state or failed state of the engine in addition to the drive control of the injector 21, the drive control of the spark wire coils (not shown) which operate spark plugs, the opening angle control of the EGR valve, and the combustion pressure control by the high-pressure regulator 27. The throttle controller 160 also performs the opening and closing control of the electronically controlled throttle value 15 in accordance with the accel instruction of the driver or an operating state or failed state of the engine.

Hence, as shown in FIG. 2, to the ECU 16 detection signals are transmitted from a first accel position sensor (APS1) 51A, an air flow sensor (not shown), an intake-air temperature sensor 36, a throttle position sensor (TPS2) 37B for detecting a throttle opening angle, an idle switch 38, a boost sensor (not shown), an air-con switch (not shown), a shift position sensor (not shown), a wheel speed sensor (not shown), a power steering wheel switch (not shown) for detecting an operating state of a power steering wheel, a starter switch (not shown), a first-cylinder sensor 40, a crank angle sensor 41, a water temperature sensor 42 for detecting temperature of engine cooling water, an $O_2$ sensor 43 for detecting oxygen concentration in exhaust gas, etc. Note that since the revolution speed of the engine can be computed based on the crank angle sensor 41, the crank angle sensor 41 is also called an engine revolution speed sensor for convenience' sake.

In addition, as shown in FIG. 2, to the throttle controller 160 detection signals are transmitted from an accel position sensor (APS2) 51B, a throttle position sensor (TPS1) 37A, etc.

The ECU 16 and the throttle controller 160 are constituted so that information can be exchanged therebetween by communication.

Furthermore, this engine is provided with an automatic transmission (AT) 170 and an automatic transmission controller (AT controller) 171 as automatic transmission control means for controlling the automatic transmission 170. Similarly, the ECU 16 and the AT controller 171 are constituted so that information can be exchanged therebetween by communication.

This AT 170 is constituted as a five speed automatic transmission equipped with a plurality of speed change gear stages from 1st speed to 5th speed. In this embodiment, the 1st speed gear stage and 2nd speed gear stage are referred to as a low speed gear stage. The 3rd speed gear stage is referred to as an intermediate speed gear stage. The 4th speed gear stage and 5th speed gear stage are referred to as a high speed gear stage.

The AT controller 171 is equipped with an automatic speed change mode which automatically selects an optimum speed change gear stage from among the speed change gear stages of the AT 170 and a manual speed change mode (sport mode) which can select a speed change gear stage by the operation of a shift lever (not shown). The switch between the automatic speed change mode and the manual speed change mode is performed with the shift lever (not shown) by driver's operation.

Figure 6:
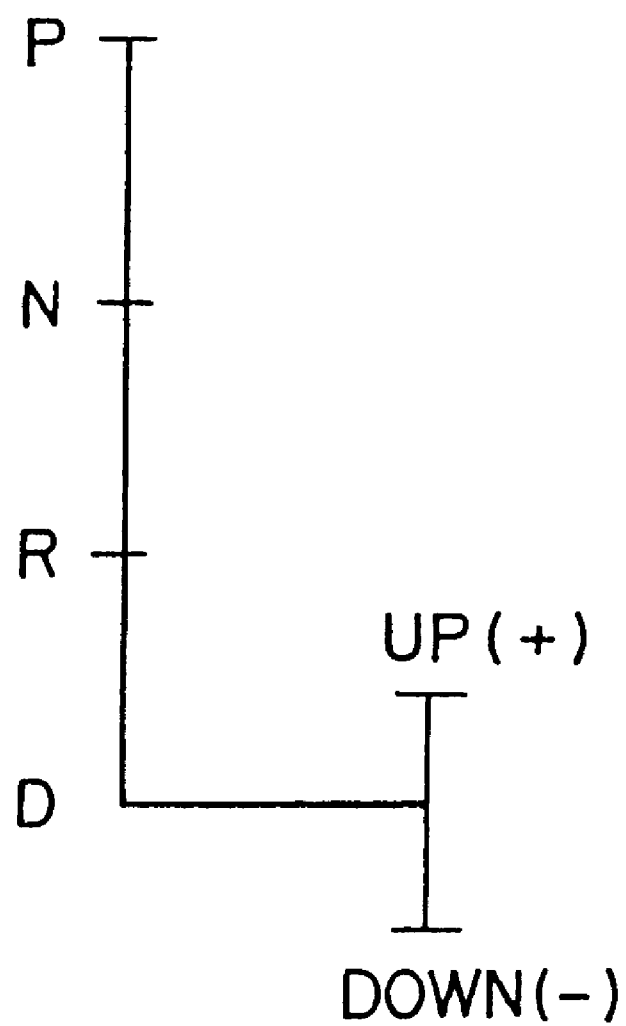
FIG. 6 is a schematic diagram for describing the automatic speed change mode and manual speed change mode of the automatic transmission of a vehicle according to the embodiment of the present invention.

The shift pattern is formed as shown in FIG. 6. In the figure, if the driver sets the shift lever (not shown) at the position of a D range (drive range) indicated by "D", the automatic speed change mode will be set. If the driver moves the shift lever (not shown) to the UP or DOWN range side indicated by "UP" and "DOWN", the AT controller 171 will be switched to the manual speed change mode. In the figure, P denotes a parking range (P range), N a neutral range (N range), and R a reverse range (R range).

The automatic speed change mode used herein changes each speed change gear stage of the automatic transmission automatically, and can automatically perform speed change control corresponding to vehicle speed and an accel opening angle on the basis of information from various sensors. The manual speed change mode allows the selection of a speed change gear stage in accordance with the speed change intention of the driver, whereby speed change control can be performed.

This engine is also equipped with an automatic cruise function, and according to input information relevant to automatic cruising, the throttle opening angle control by the throttle controller 160 is performed.

Such an engine, incidentally, has as operating modes a late lean combustion operating mode (compression stroke injection mode), an early lean combustion operating mode, a stoichiometric feedback operating mode, and an open-loop combustion operating mode. Any of these modes is selected according to an operating state of the engine (i.e., engine revolution speed and engine load) or a traveling state of the vehicle.

Among these modes, the late lean combustion operating mode is a mode in which fuel injection is performed in a stage extremely near ignition timing as in the latter period of the compression stroke and also stratified-charge combustion is performed by collecting fuel near the spark plug in such a manner that the air-fuel ratio is partially rich and lean as a whole. The late leans combustion operating mode is also a super-lean combustion mode in which economical operation can be performed ensuring ignitability and combustion stability. Although this embodiment sets the total air-fuel ratio to an area of about 24 or higher and can realize the leanest combustion, the total air-fuel ratio may be set to a lower area than this embodiment (e.g., a range in which the total air-fuel ratio is about 23 or higher) or may be set to a higher area than this embodiment.

Although the early lean combustion operating mode is also a lean combustion mode, this mode performs fuel injection (primarily on the intake stroke) before the late lean combustion operating mode. The early lean combustion operating mode is a mode in which economical operation is performed by premixing air and fuel so that ignitability and combustion stability are ensured and also a certain degree of output is obtained, while causing the air-fuel ratio to be leaner as a whole than a stoichiometric air-fuel ratio. The area of the early lean combustion operating mode here is set to an area where the total air-fuel ratio is between a stoichiometric air-fuel ratio and about 24.

Also, the stoichiometric feedback combustion operating mode is made on the basis of the output of the $O_2$ sensor so that sufficient engine output is efficiently obtained, while the air-fuel ratio is being maintained in a stoichiometric state. In this mode the premixed combustion based on the fuel injection on the intake stroke is performed.

In addition, in the open-loop combustion operating mode, combustion is performed at a stoichiometric or rich air-fuel ratio by open-loop control so that sufficient output is obtained when the vehicle is accelerated or started. In this mode the premixed combustion based on the fuel injection on the intake stroke is performed.

Each operating mode such as this is selected according to engine revolution speed and engine load by the ECU 16 to be described later. In a low revolution and low load state, the late lean combustion operating mode is usually selected. If engine revolution speed or engine load increases, the operating mode will be switched to the early lean combustion operating mode and the stoichiometric combustion operating mode in this order. If engine revolution speed or engine load increases further, the operating mode will be switched to the open-loop mode (enriched combustion operating mode).

The ECU 16 selects the operating modes in this manner and then performs various controls. However, in the late lean combustion operating mode, in which fuel is injected on the compression stroke and also the air-fuel ratio is extremely high, if attention is paid to throttle value control, air will insufficient at the opening angle of the throttle value corresponding to the opening angle of the accel pedal in order to achieve a target air-fuel ratio. Therefore, a target opening angle ("pseudo"-target opening angle) considerably greater than the throttle valve opening angle corresponding to the accel opening angle is set, and based on this, the opening angle control of the throttle value is performed. Also, even in the stoichiometric feedback combustion operating mode and the open-loop combustion operating mode, there are cases where air becomes insufficient at the throttle value opening angle corresponding to the accel opening angle. In this case a target opening angle (pseudo-target opening angle) suitably greater than the throttle valve opening angle corresponding to the accel opening angle is set, and based on this, the opening angle control of the throttle value is performed.

[Description of an Intake Control System]

Now, if a description is made giving attention to both the electronic throttle control unit (DBW) 150 and the control system of the LHV 12 (i.e., limp home valve control unit) 120 relevant to the control apparatus of the present invention, these control systems are constituted as shown in FIG. 1.

In other words, the electronically controlled throttle valve 15 constituting the DBW 150 is provided with a butterfly valve 151 arranged in the intake-air passage 5A within the throttle body 5, a return spring 153 arranged so as to surround a shaft 152 supporting the butterfly valve 151 in order to give closing and urging force to the butterfly valve 151, an electric motor (throttle actuator) 154 as drive means for electrically rotating the shaft 152, and a gear mechanism 155 interposed between the actuator 154 and the shaft 152.

The shaft 152 is provided with a throttle position sensor 37 for detecting an opening angle of the butterfly valve 151 (throttle valve opening angle). The throttle position sensor 37 consists of a first throttle position sensor (TPS1) 37A and a second throttle position sensor (TPS2) 37B. Thus, the apparatus of the present invention is provided with two throttle position sensors (TPS1 and TPS2) 37A and 37B. The two throttle positions sensors 37A and 37B are provided in case of failure.

The DBW 150 is constituted by the electrically controlled throttle valve 15, the ECU 16 for setting a target opening angle of this electrically controlled throttle valve 15, and the throttle controller 160 for controlling operation of the actuator 154 on the basis of the target opening angle set by the ECU 16 and adjusting an opening angle of the throttle valve.

For this reason, as shown in FIG. 1, the ECU 16 is provided with a target opening angle setting section 16A, and the throttle controller 160 is provided with a throttle opening angle feedback control section 160A.

Figure 3:
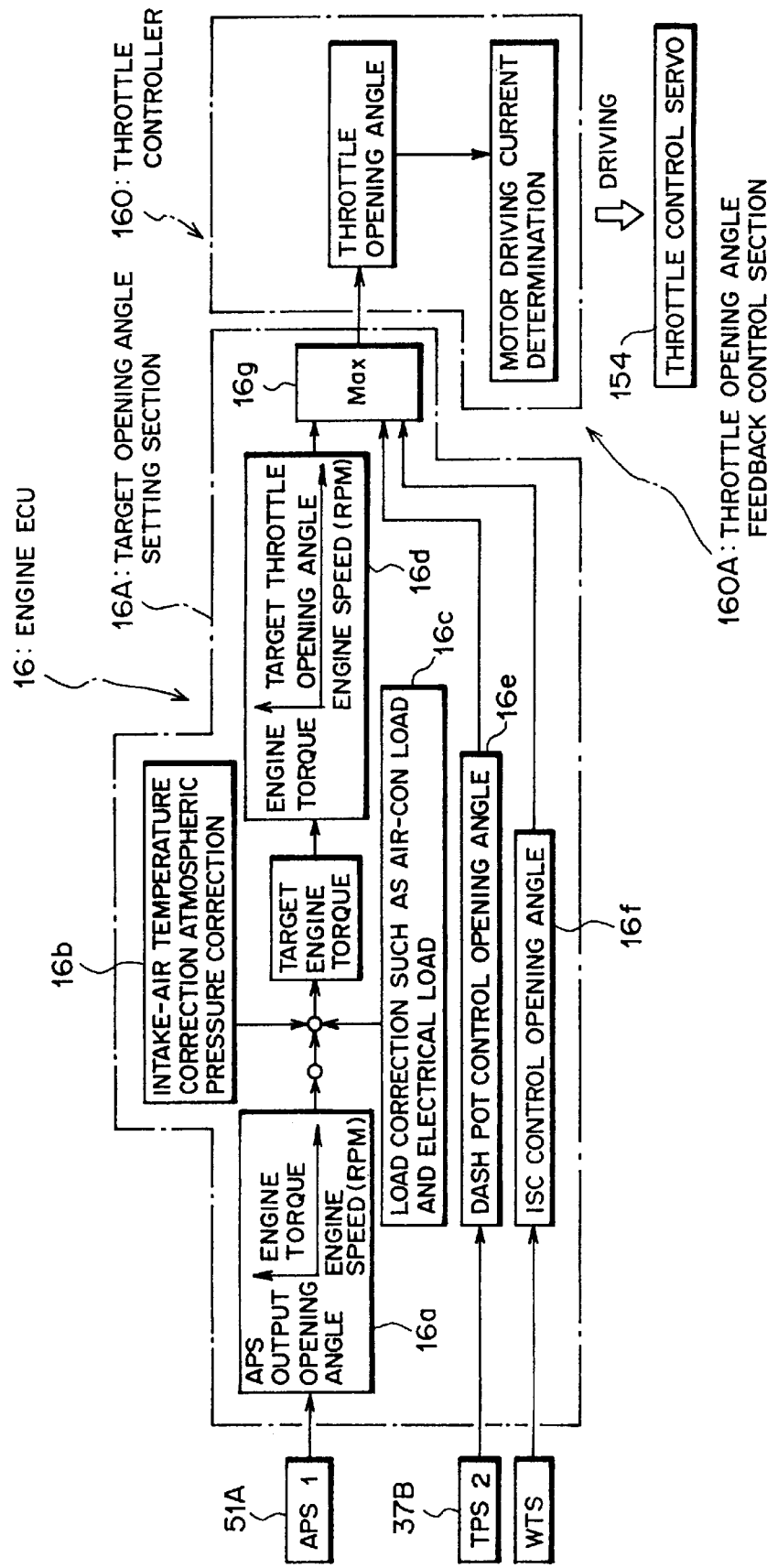
FIG. 3 is a block diagram showing the intake control system of the internal combustion engine provided in a vehicle according to the embodiment of the present invention.
Figure 4:
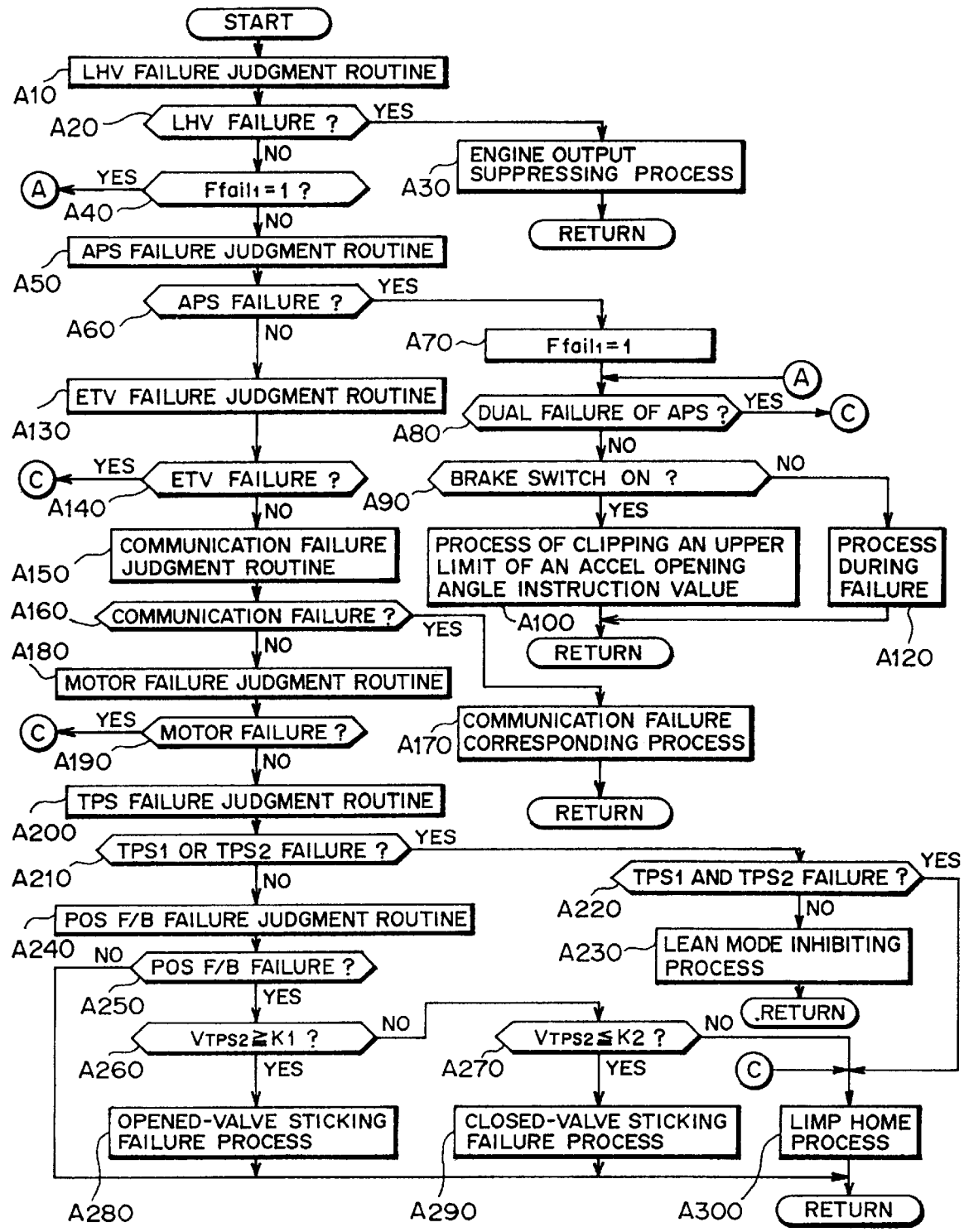
FIG. 4 is a flowchart showing the failure counter plan process of the intake control system of the internal combustion engine provided in a vehicle according to the embodiment of the present invention.

FIG. 3 shows a control block diagram paying attention to throttle control. As shown in the figure, the target opening angle setting section 16A of the ECU 16 is provided with a first function 16a of setting a target engine torque from both the detection information from the first accel position sensor (APS1) 51A and the engine revolution speed obtained from the detection result of the crank angle sensor 41 (see FIG. 2), a second function 16b of making an intake-air temperature correction and an atmospheric pressure correction on the set target engine torque, a third function 16c of making corrections relevant to the air conditioner and electrical load, and a fourth function 16d of setting a target throttle opening angle from the corrected target engine torque and the engine revolution speed.

The target opening angle setting section 16A is further provided with a fifth function 16e of setting a dash pot control opening angle on the basis of the detection information from the second throttle position sensor (TPS2) 37B, a sixth function 16f of setting an idle speed control opening angle in accordance with the engine cooling water temperature information detected by the water temperature sensor (WTS), and a seventh function 16g of selecting the maximum value from among the set opening angles. The target opening angle setting section 16A outputs the selected maximum set opening angle to the throttle controller 160 as the target opening angle of the throttle valve.

The throttle opening angle feedback control section 160A of the throttle controller 160 decides a motor driving current in accordance with the throttle valve target opening angle output from the ECU 16 and controls driving of the actuator (also called a throttle control servo motor) 154. At this time, in the throttle controller 160, the feedback control of the throttle valve is performed according to the opening angle (actual opening angle) of the throttle value detected with the first throttle position sensor (TPS1) 37A.

Incidentally, in this apparatus, as shown in FIG. 1, as with the case of the throttle position sensors (TPS1 and TPS2) 37A and 37B, the accel position sensor 51 also consists of two accel position sensors, a first accel position sensor (APS1) 51A and a second accel position sensor (APS2) 51B. The two accel position sensors are also provided in case of failure.

For this reason, the signal detected by the first accel position sensor (APS1) 51A is input to the ECU 16 and employed in the setting of the throttle valve target opening angle. The signal detected by the second accel position sensor (APS2) 51B is input to the throttle controller 160. If the first accel position sensor 51A fails, the detection signal of the second accel position sensor 51B will be transmitted from the throttle controller 160 to the ECU 16 by communication and employed in the setting of the throttle valve target opening angle.

Similarly, for the throttle position sensor 37, the signal detected by the first throttle position sensor (TPS1) 37A is input to the throttle controller 160 and employed in the feedback control of the throttle valve 15. The signal detected by the second throttle position sensor (TPS2) 37B is input to the ECU 16 and employed in the aforementioned dash pot control. If the first throttle position sensor 37A fails, the detection signal of the second throttle position sensor 37B will be transmitted from the ECU 16 to the throttle controller 160 by communication and employed in the feedback control of the throttle valve.

On the other hand, the limp home valve 12 is constituted by the bypass passage 13 arranged parallel with the intake passage 5A within the throttle body 5 (i.e, between the upstream and downstream sides of the butterfly valve 151 of the electronically controlled throttle valve 15), the LHV main body 14 arranged in the bypass passage 13, a linear solenoid (not shown) for opening and closing the LHV main body 14, and the ECU 16 for controlling operation of the linear solenoid. The control system (limp home valve control unit) 120 is constituted by the linear solenoid and ECU 16.

The limp home valve unit 12 is provided in order to cope with an unlikely failure of the DBW 150. But, in this apparatus, the ECU 16 and the throttle controller 160 perform a variety of failure judgments as a counter plan against such a failure of the DBW 150. For various failure judgments, the respective corresponding processes are performed, for example, with the employment of the limp home valve unit 12.

As shown in FIG. 1, in order to utilize the various failure judgments in the failure corresponding processes, a power source relay 62 is arranged in a power supply circuit from a battery 61 to the throttle controller 160 and is turned on or off by the ECU 16.

Now, a description will be made of the failure judgment processes.

A. Position feedback failure

First, a description will be made of the judgment process of the failure (position feedback failure) that the opening angle (position) of the electronically controlled throttle valve 15 cannot be adjusted as instructed.

For the position feedback failure, there is (1) valve system sticking failure (including fully closed sticking) and (2) motor output open failure. When a position feedback failure signal is received, failure is judged.

This failure judgment is performed when all premise conditions for the failure judgment are established. For example, the premise conditions are (1) the ignition switch is on, (2) the relay motor is on, or communication abnormality from the ECU 16 to the throttle controller 160 has occurred, (3) the battery voltage Vb is equal to or greater than a predetermined value, and (4) no communication abnormality from the throttle controller 160 to the ECU 16 has occurred.

One position feedback failure is the sticking of the electronically controlled throttle value 15. In this case the opening angle of the stuck electronically controlled throttle valve 15 can be detected with the first throttle position sensor (TPS1) 37A. Therefore, from this opening angle information, when the throttle valve 15 has been stuck at an opening angle equal to or greater than a first predetermined opening angle (opened-valve sticking), an open sticking corresponding process (opened-valve sticking failure process) is performed, and when the throttle valve 15 has been stuck at an opening angle equal to or less than a second predetermined opening angle (closed-valve sticking), a closed sticking corresponding process (closed-valve sticking failure process) is performed.

B. Motor failure

In failures of the motor, there is (1) a motor ground fault and (2) a motor overcurrent fault (overcurrent detection). When a ground or overcurrent failure signal of the motor output is received, failure is judged. This failure judgment is performed when all premise conditions for the failure judgment are established. The premise conditions are (1) the motor relay is on and (2) no communication abnormality from the throttle controller 160 to the ECU 16 has occurred. When there is motor failure such as this, a limp home mode process to be described later is performed.

C. TPS failure

The throttle position sensor 37 consists of two sensors, first and second throttle positions sensors 37A and 37B, and for the failure of the first throttle position sensor (TPS1) 37A that is employed in the feedback control by the throttle controller 160, there is (1) failure due to a broken connection or short circuit in the current circuit and (2) a linearity defect. For the failure of the second throttle position sensor (TPS2) 37B, there is (3) characteristic abnormality and (4) failure due to a broken connection or short circuit in the current circuit. When the respective failure signals are received, failure is judged.

This failure judgment is performed when all premise conditions for the failure judgment are established. The premise conditions are (1) the ignition switch is on and (2) no communication abnormality from the throttle controller 160 to the ECU 16 has occurred.

When the first throttle position sensor (TPS1) 37A has failed, a process of limiting the operating area of the engine is performed, because the failure interferes with the feedback control of the throttle valve. Also, at the time of the failure of the first throttle position sensor (TPS1) 37A, if the second throttle position sensor (TPS2) 37B has already failed or if there is communication abnormality to be described later (communication abnormality from the ECU 16 to the throttle controller 160), a limp home process will be performed.

D. Communication failure

Communication is performed between the ECU 16 and the throttle controller 160, and in communication failure, there is communication abnormality from the ECU 16 to the throttle controller 160 and communication abnormality from the throttle controller 160 to the ECU 16.

For the communication abnormality from the ECU 16 to the throttle controller 160, when the throttle controller 160 receives a communication failure signal from the ECU 16, failure is judged.

This failure judgment is performed when all premise conditions for the failure judgment are established. The premise conditions are (1) the battery voltage Vb is equal to or greater than a predetermined value and (2) no communication abnormality from the throttle controller 160 to the ECU 16 has occurred.

When this communication failure has occurred, the following processes are performed, because the throttle controller 160 cannot fetch the target opening angle set by the ECU 16 and therefore there is a high possibility that the intake air volume control cannot be appropriately performed.

(1) Lean operation inhibiting process (2) Cruise control inhibiting process (3) Fuel cutting process during the high revolution (e.g., Ne≧3000 rpm) of the engine For the communication abnormality from the throttle controller 160 to the ECU 16, when any of the following conditions is established, failure is judged.

(1) There is a check sum error.

(2) There is an overrun framing error.

(3) There is incomplete communication for a predetermined time (e.g., for 25 msec).

This failure judgment is performed when all premise conditions for the failure judgment are established. The premise conditions are (1) the battery voltage Vb is equal to or greater than a predetermined value and (2) the cruising switch is off.

Likewise, when this communication failure has occurred, the following processes are performed, because the ECU 16 cannot fetch a control signal from the throttle controller 160 and therefore there is a high possibility that the intake air volume control cannot be appropriately performed.

(1) Transmission of communication failure to the throttle controller 160

(2) Lean operation inhibiting process (3) Cruise control inhibiting process (4) Fuel cutting process during the high revolution (e.g., Ne≧3000 rpm) of the engine (5) When the brake pedal is depressed, clip the upper limit of the target opening angle of the throttle valve 15 instructed from the ECU 16.

E. Throttle controller failure (ETV failure)

For a failure of the throttle controller 160, when all of the following conditions (1) through (4) are established, or when all of the following conditions (5) through (8) are established, failure is judged.

(1) The ignition switch is on.

(2) There is no abnormality in the second accel position sensor (APS2) 51B and the second throttle position sensor (TPS2) 37B.

(3) Communication abnormality from the ECU 16 to the throttle controller 160 has occurred.

(4) $|(V_{APS2})/2-(5v-V_{TPS2})|\geq 1$ v (5) The ignition switch is on.

(6) There is no abnormality in the second accel position sensor (APS2) 51B and the second throttle position sensor (TPS2) 37B.

(7) Communication abnormality from the throttle controller 160 to the ECU 16 has occurred.

(8) $|(opening\ angle\ voltage\ instructed\ from\ ECU)-V_{TPS2}|\geq 1$ v

If a failure of the throttle controller 160 such as this is judged, a limp home process will be performed.

F. APS failure

The accel position sensor 51 consists of two sensors, first and second accel positions sensors (APS1 and APS2) 51A and 51B, and for the failures of these first and second accel position sensors (APS1 and APS2) 51A and 51B, there is (1) failure due to a short circuit in the current circuit and failure due to a broken connection between the sensor and ground, (2) failure due to a broken connection in the current circuit and failure due to a short circuit between the sensor and ground, and (3) characteristic abnormality.

For the second accel position sensor (APS2) 51B, the failure due to a short circuit in the current circuit and failure due to a broken connection between the sensor and ground are judged when both of the following conditions are established, on the premise that (1) there is no communication abnormality and also (2) there is no abnormality in the first accel position sensor (APS1) 51A.

(1) The output value $V_{APS2}$ of the second accel position sensor 51B is equal to or greater than a predetermined value V1 (e.g., if V1=4.5 v, $V_{APS2}\geq 4.5$ v).

(2) The output value $V_{APS1}$ of the first accel position sensor 51A is in a predetermined area (e.g., $0.2\ v\leq V_{APS1}\leq 2.5$ v).

For the second accel position sensor (APS2) 51B, the failure due to a broken connection in the current circuit and failure due to a short circuit between the sensor and ground are judged when the output value VAPS2 of the second accel position sensor 51B is less than a predetermined value V2 (e.g., if V2=0.2 v, $V_{APS2}<0.2$ v).

For the first accel position sensor (APS1) 51A, the failure due to a short circuit in the current circuit and failure due to a broken connection between the sensor and ground are judged when both of the following conditions are established, on the premise that (1) there is no communication abnormality and also (2) there is no abnormality in the second accel position sensor (APS2) 51B.

(1) The output value $V_{APS1}$ of the first accel position sensor 51A is equal to or greater than a predetermined value V3 (e.g., if V2=4.5 v, $V_{APS1}\geq 4.5$ v).

(2) The output value $V_{APS2}$ of the second accel position sensor 51B is in a predetermined area (e.g., $0.2\ v\leq V_{APS2}\leq 2.5$ v).

For the first accel position sensor (APS1) 51A, the failure due to a broken connection in the current circuit and failure due to a short circuit between the sensor and ground are judged when the output value $V_{APS1}$ of the first accel position sensor 51B is less than a predetermined value V4 (e.g., if V4=0.2 v, $V_{APS1}<0.2$ v).

In addition, the characteristic abnormality in the accel position sensor is judged when $V_{APS2}\geq 1.1$ v, on the premise that the idle switch is on (i.e., during idle running).

When the second accel position sensor 51B has failed, the following processes are performed.

(1) Setting of $V_{APS}=V_{APS1}/2$ (2) Lean operation inhibiting process (3) Cruise control inhibiting process (4) Process of clipping the upper limit of engine output However, after the failure detection of the second accel position sensor (APS2) 51B, when communication abnormality from the throttle controller 160 to the ECU 16 has occurred, the limp home process is performed.

Also, when the first accel position sensor 51A has failed, the following processes are performed.

(1) Setting of $V_{APS}=V_{APS2}/2$ (2) Lean operation inhibiting process (3) Cruise control inhibiting process (4) Process of clipping the upper limit of engine output However, if the second accel position sensor (APS2) 51B has already failed, the limp home process will be performed.

When the characteristic abnormality in the accel position sensor has occurred, the following processes are performed.

(1) Setting of $V_{APS}=V_{APS1}/2$ (2) Lean operation inhibiting process (3) Cruise control inhibiting process (4) Process of clipping the upper limit of engine output However, if the first accel position sensor (APS1) 51A has already failed, the limp home process will be performed.

G. LHV failure

The failure judgment of the LHV 12 is performed when (1) the LHV solenoid is off and also (2) the terminal voltage Lo is detected.

When this LHV 12 has failed, the following processes are performed.

(1) A forced compression lean operation is set.

(2) Fuel cutting process during the high revolution (e.g. Ne≧3000 rpm) of the engine (3) Cut EGR.

(4) Inhibit the engine speed feedback control of idle speed control

The limp home process, incidentally, is performed by operating the LHV 12 so that air can be supplied to each combustion chamber (cylinder) of the engine. The LHV main body 14 of the LHV 12 is normally turned on and off, and in order to operate the LHV 12, the LHV main body 14 is caused to be in an ON state.

Therefore, during the limp home process, the intake air volume is not adjusted, and the vehicle speed control is performed exclusively by driver's braking operation without adjusting engine output itself.

For this reason, the intake air volume during operation of the LHV 12 is suppressed so that engine output is not excessively increased. In other words, during operation of the LHV 12, the intake air volume is controlled in such a manner that engine output necessary for performing certain travel is obtained and also the speed reduction and stopping by driver's braking operation are not hindered.

Specifically, in the limp home process, the following processes are performed.

A: Fuel cut process

1) During forward travel (1) When the output value of the second accel position sensor (APS2) 51B is less than a predetermined value ((5v–$V_{APS2}$) >1.5 v), fuel is injected into all cylinders.

(2) When the output value of the second accel position sensor (APS2) 51B is equal to or greater than the predetermined value ((5 v–$V_{APS2}$)≦1.5 v), injection of fuel into some of the cylinders (e.g., 3 cylinders if there are a total of 6 cylinders) is cut.

(3) When the second accel position sensor (APS2) 51B has failed, injection of fuel into some of the cylinders (e.g., 3 cylinders if there are a total of 6 cylinders) is cut.

(4) When the accel pedal is depressed, injection of fuel into some of the cylinders (e.g., 3 cylinders if there are a total of 6 cylinders) is cut.

2) During reverse travel Injection of fuel into some of the cylinders (e.g., 3 cylinders if there are a total of 6 cylinders) is cut.

B: The motor relay is turned off.

C: The LHV 12 is turned on (however, when the brake pedal is depressed (when the brake switch 200 is on), the duty control of the LHV 12 is performed at 5 Hz for a predetermined time (e.g., 2 sec)).

D: A lean operation is inhibited.

E: Cruise control is inhibited.

F: The feedback control of the engine revolution speed is inhibited.

G: The warning lamp is lit.

H: Once a transition to the limp home mode is made, a return to normal operation will not be made until the ignition switch is turned off.

Note that in each failure process, the lean mode is inhibited. Since the lean mode is a mode which is established on the basis of high precision throttle control, there is a possibility that stable combustion will be degraded, if the lean mode is performed during TPS failure. To avoid this combustion degradation, the lean mode is inhibited.

Now, a description will be made of the failure judgment process (sticking judgment process) in the case of the position feedback failure due to sticking of the electronically controlled throttle valve 15, the failure judgment process being the feature of the control apparatus for a vehicle according to the embodiment of the present invention.

For this failure judgment process, the ECU 16 and the throttle controller 160, as shown in FIG. 1, are provided with failure judgment means (sticking judgment means) 70, respectively. The failure judgment means 70 judges whether or not failure due to sticking of the electronically controlled throttle valve 15 has occurred. Based on this result of judgment, the use and selection of the speed change gear stages of the AT 170 are controlled by the AT controller 171.

The failure judgment means 70 reads a target opening angle set based on detection information from the accel position sensor 51A and also reads the opening angle of the electronically controlled throttle valve 15 detected by the second throttle position sensor (TPS2) 37B. The target opening angle is compared with the opening angle of the electronically controlled throttle valve 15. If the opening angle difference equal to or greater than a predetermined opening angle (e.g., 1°) continues over a predetermined time (e.g., 500 ms), it will be judged that failure due to the sticking of the electronically controlled throttle valve 15 has occurred.

Also, although the target opening angle set based on detection information from the accel position sensor 51A has been small, if the second throttle valve opening angle $V_{TPS2}$ of the electronically controlled throttle valve 15 detected by the second throttle position sensor (TPS2) 37B does not become small (i.e., if the second throttle valve opening angle $V_{TPS2}$ remains at an opening angle position (large opening angle state) equal to or greater than a predetermined value K1 (K1: a value near the fully opened valve) as a first predetermined opening angle), opened-valve sticking will be judged. Conversely, although the target opening angle set based on detection information from the accel position sensor 51A has been large, if the second throttle valve opening angle $V_{TPS2}$ of the electronically controlled throttle valve 15 detected by the second throttle position sensor (TPS2) 37B does not become large (i.e., if the second throttle valve opening angle $V_{TPS2}$ remains at an opening angle position (small opening angle state) equal to or less than a predetermined value K2 (K2: a value near the fully closed valve) as a second predetermined opening angle (predetermined opening angle)), closed-valve sticking will be judged. The predetermined value K2 as the second predetermined opening angle is set to a value smaller than the predetermined value K1 as the first predetermined opening angle.

In the case where the electronically controlled throttle valve 15 has remained at a position equal to or greater than the predetermined value K1, the failure judgment means 70 judges that opened-valve sticking has occurred and performs an open sticking corresponding process (opened-valve sticking failure process). Conversely, in the case where the electronically controlled throttle valve 15 has remained at a position equal to or less than the predetermined value K2, the failure judgment means 70 judges that closed-valve sticking has occurred and performs a closed sticking corresponding process (closed-valve sticking failure process).

In the opened-valve sticking failure process, the AT controller 171 performs a process of inhibiting the use of the 1st and 2nd speed gear stages as the low speed side gear stage among the speed change gear stages of the AT 170 in order to reduce a vehicle driving torque even in the case where there is a great volume of intake air, and also performs a process of inhibiting the use of the 5th speed gear stage as the high speed side gear stage in order to prevent a considerable reduction in a vehicle driving torque.

Such function of the AT controller 171 inhibiting the use of the 1st and 2nd speed gear stages as the low speed side gear stage among the speed change gear stages of the AT 170 and also inhibiting the use of the 5th speed gear stage as the high speed side gear stage is referred to as speed change regulation means 171A.

This speed change regulation means 171A allows the selection of the 3rd speed gear or 4th speed gear stage as the intermediate gear stage in order to prevent a considerable reduction in a vehicle driving torque, while reducing the vehicle driving torque.

Also, in the case where the driver moves the shift lever to the UP or DOWN range side indicated by "UP" and "DOWN" in FIG. 6 and thereby switches the AT controller 171 to the manual speed change mode, the speed change regulation means 171A of the AT controller 171 performs a process of allowing the selection of more speed change gear stages than the speed change gear stages allowed to be selected in the automatic speed change mode, and consequently, it becomes possible to judge a torque requested by the driver by the speed change operation.

For example, when the selection of the 3rd speed gear stage is allowed in the automatic speed change mode, the speed change regulation means 171A of the AT controller 171 performs a process of allowing the selection of the speed change gear stage (2nd speed gear stage) lower by one stage than that or speed change gear stage (4th speed gear stage) higher by one stage than that. Also, when the selection of the 4th speed gear stage is allowed in the automatic speed change mode, the speed change regulation means 171A of the AT controller 171 performs a process of allowing the selection of the speed change gear stage (3rd speed gear stage) lower by one stage than that or speed change gear stage (5th speed gear stage) higher by one stage than that.

Thus, in the case where the speed change regulation means 171A of the AT controller 171 is inhibiting the use of the low speed side gear stage in the automatic speed change mode, if the AT controller 171 is switched to the manual speed change mode, the speed change regulation means 171A of the AT controller 171 will change the range of the low speed side gear stage toward the low speed side by at least one stage and inhibit the use of the changed low speed side gear stage. Also, in the case where the speed change regulation means 171A of the AT controller 171 is inhibiting the use of the high speed side gear stage in the automatic speed change mode, if the AT controller 171 is switched to the manual speed change mode, the speed change regulation means 171A of the AT controller 171 will change the range of the high speed side gear stage toward the high speed side by at least one stage and inhibit the use of the changed high speed side gear stage.

In this case, when the AT controller 171 has selected the intermediate speed side gear stage in the automatic speed change mode by the speed change regulation means 171A of the AT controller 171, if the AT controller 171 is switched to the manual speed change mode, the speed change regulation means 171A of the AT controller 171 will change the range of the intermediate speed side gear stage toward the low speed side or high speed side by at least one stage and select the changed intermediate speed side gear stage.

On the other hand, in the closed-valve sticking failure process, the speed change regulation means 171A of the AT controller 171 inhibits the use of the 5th speed gear stage as the high speed gear stage among the speed change gear stages of the AT 170 in order to raise a vehicle driving torque, and also inhibits the use of the 1st and 2nd speed gear stages as the low speed gear stage among the speed change gear stages of the AT 170 in order to prevent a considerable rise in a vehicle driving torque. In other words, the speed change regulation means 171A of the AT controller 171 performs a process of allowing the use of the 3rd speed gear stage or 4th speed gear stage as the intermediate gear stage in order to reduce a vehicle driving torque, while preventing a considerable reduction in the vehicle driving torque. In the case of a four speed automatic transmission, it is preferable to allow the selection of the 2nd speed gear stage or 3rd speed gear stage as an intermediate speed gear stage.

Also, in the case where the driver moves the shift lever to the UP or DOWN range side indicated by "UP" and "DOWN" in FIG. 6 and thereby switches the AT controller 171 to the manual speed change mode, the speed change regulation means 171A of the AT controller 171 performs a process of allowing the selection of more speed change gear stages than the speed change gear stages allowed to be selected in the automatic speed change mode, as described above, and consequently, it becomes possible to judge a torque requested by the driver by the speed change operation.

Since the control apparatus for a vehicle as an embodiment of the present invention is constituted as described above, the process shown in FIG. 4, for example, will be carried out if the intake control system, i.e., the electronic throttle control unit (DBW) 150 and the LHV 12 fail.

First, the process relevant to the judgment of LHV failure is performed by an LHV failure judgment routine (step A10). In the judgment of LHV failure, it is judged (1) whether or not the LHV solenoid is off and (2) whether or not the terminal voltage Lo has been detected. If (1) the LHV solenoid is off and also (2) the terminal voltage Lo has been detected, LHV failure will be judged. In this case, in step A30 via judgment of step A20, an engine output suppressing process is performed. Specifically, the following processes are performed.

(1) The operating mode is forcibly set to the late lean combustion mode (compression stroke injection mode), thereby suppressing the output of the engine.

(2) If the engine revolution speed Ne reaches a predetermined revolution speed (e.g., 3000 rpm) or greater, fuel supply will be cut, thereby suppressing the engine output.

(3) EGR is cut, thereby causing stable combustion to have priority over exhaust gas purification.

(4) For the idle speed control, the feedback control of the engine revolution speed is inhibited, thereby giving priority to stable combustion.

On the other hand, if there is no failure of the LHV 12, the process will advance to step A40 via the judgment of step A20. In step A40 it is judged whether or not an APS fail flag $F_{fail1}$ is 1. This APS fail flag $F_{fail1}$ will be 1 if either of the accel position sensors (APS) 51A and 51B fails, and will be 0 if not so. If the APS fail flag $F_{fail1}$ is 1, the process will advance to a dual failure judgment routine of step A80. If the APS fail flag $F_{fail1}$ is not 1, the process will advance to an APS failure judgment routine of step A50.

In the APS failure judgment routine of step A50, for the first accel position sensor (APS1) 51A and the second accel position sensor (APS2) 51B, a judgment process such as the aforementioned is performed with regard to (1) failure due to a short circuit in the current circuit and failure due to a broken connection between the sensor and ground, (2) failure due to a broken connection in the current circuit and failure due to a short circuit between the sensor and ground, and (3) characteristic abnormality.

If APS failure is judged, the process will advance to step A80 via step A70. In step A80 it is judged whether or not both the first and second accel position sensors (APS1 and APS2) 51A and 51B have failed. If dual failure of the accel positions sensors has occurred, the process will advance to step A300 and the limp home process will be performed. If no dual failure has occurred, i.e., if only either of the two accel position sensors has occurred, the process will advance to step A90.

In step A90 it is judged whether or not the brake switch 200 is on, i.e., whether or not the braking operation has been performed. If the braking operation has been performed, the process will advance to step A100 and a throttle opening angle instruction value will be clipped at the upper limit value to suppress the intake air volume, thereby suppressing the output of the engine. If no braking operation has been performed, the process will advance to step A120 and each failure process will be performed according to APS failure.

In other words, when the second accel position sensor 51B has failed, (1) setting of $V_{APS}=V_{APS1}/2$, (2) lean operation inhibiting process, (3) cruise control inhibiting process, and (4) process of clipping the upper limit of engine output are performed. However, after the failure detection of the second accel position sensor (APS2) 51B, when communication abnormality from the throttle controller 160 to the ECU 16 has occurred, the limp home process is performed.

When the first accel position sensor 51A has failed, (1) setting of $V_{APS}=V_{APS2}/2$, (2) lean operation inhibiting process, (3) cruise control inhibiting process, and (4) process of clipping the upper limit of engine output are processed. However, if the second accel position sensor (APS2) 51B has already failed, the limp home process will be performed.

In addition, when the characteristic abnormality in the accel position sensor has occurred, (1) setting of $V_{APS}=V_{APS1}/2$, (2) lean operation inhibiting process, (3) cruise control inhibiting process, and (4) process of clipping the upper limit of engine output are performed. However, if the first accel position sensor (APS1) 51A has already failed, the limp home process will be performed.

On the other hand, if there is no APS failure, the process will advance from step A60 to an ETV judgment routine of step A130.

In this ETV judgment routine, a failure of the throttle controller is judged. The throttle controller is judged to have failed when (1) the ignition switch is on, (2) there is no abnormality in the second accel position sensor (APS2) and the second throttle position sensor (TPS2), (3) communication abnormality from the ECU 16 to the throttle controller 160 has occurred, and (4) $|(V_{APS2})/2-(5 \text{ v}-V_{TPS2})| \geq 1$ v, or when (5) the ignition switch is on, (6) there is no abnormality in the second accel position sensor (APS2) and the second throttle position sensor (TPS2), (7) communication abnormality from the throttle controller 160 to the ECU 16 has occurred, and (8) |(opening angle voltage instructed from ECU)$-V_{TPS2}| \geq 1$ v.

If the failure of the throttle controller is judged, the process will advance to step A300 via step A140 and the limp home process will be performed. If no failure of the throttle controller is judged, the process will advance to a communication failure judgment routine of step A150.

In this communication failure judgment routine, communication abnormality from the ECU 16 to the throttle controller 160 and communication abnormality from the throttle controller 160 to the ECU 16 are judged.

For the communication abnormality from the ECU 16 to the throttle controller 160, the abnormality judgment is made under the condition (zone) where (1) the battery voltage Vb is equal to or greater than a predetermined value and (2) no communication abnormality from the throttle controller 160 to the ECU 16 has occurred. When the throttle controller 160 receives a communication failure signal from the ECU 16, failure is judged.

For the communication abnormality from the throttle controller 160 to the ECU 16, the abnormality judgment is made under the condition (zone) where (1) the battery voltage Vb is equal to or greater than a predetermined value and (2) the cruising switch is off. When (1) there is a check sum error, (2) there is an overrun framing error, and (3) there is incomplete communication for a predetermined time (e.g., for 25 msec), failure is judged.

If such communication failure is judged, the process will advance to step A170 via step A160 and the communication failure corresponding process will be performed.

In other words, when the communication abnormality from the ECU 16 to the throttle controller 160 has occurred, there is a high possibility that the intake air volume control cannot be appropriately performed. Therefore, (1) the lean operation is inhibited, (2) the cruise control is inhibited, and (3) at the time of the high revolution (e.g., Ne≧3000 rpm) of the engine, fuel cut is performed.

Similarly, when the communication abnormality from the throttle controller 160 to the ECU 16 has occurred, there is a high possibility that the intake air volume control cannot be appropriately performed. Therefore, (1) communication failure is transmitted to the throttle controller 160, (2) the lean operation is inhibited, (3) the cruise control is inhibited, (4) at the time of the high revolution (e.g., Ne≧3000 rpm) of the engine, fuel cut is performed, and (5) when the brake pedal is depressed, the upper limit of the target opening angle of the throttle valve 15 instructed from the ECU 16 is clipped.

If no communication failure is judged, the process will advance to a motor failure judgment routine of step A180 via step A160.

In the motor failure judgment routine, when a ground or overcurrent failure signal of the motor output is received, motor failure is judged. This motor failure judgment is performed under the condition (zone) where (1) the motor relay is on and (2) no communication abnormality from the throttle controller 160 to the ECU 16 has occurred.

If this motor failure is judged, the process will advance to step A300 via step A190 and the limp home process will be performed. If no motor failure is judged, the process will advance to a TPS failure judgment routine of step A200.

In the TPS failure judgment routine, the failure judgment is performed under the condition (zone) where (1) the ignition switch is on and (2) no communication abnormality from the throttle controller 160 to the ECU 16 has occurred. When the respective failure signals are received, failure is judged. For the failure of the first throttle position sensor (TPS1) 37A that is employed in the feedback control by the throttle controller 160, there is (1) failure due to a broken connection or short circuit in the current circuit and (2) a linearity defect. For the failure of the second throttle position sensor (TPS2) 37B, there is (3) characteristic abnormality and (4) failure due to a broken connection or short circuit in the current circuit.

Based on the judgment result of such a TPS failure judgment routine, in step A210 it is judged whether or not either of the TPS1 and TPS2 has failed. If either of the TPS1 and TPS2 has failed, the process will advance to step A220 and it will be judged whether or not both of the TPS1 and TPS2 have failed.

If both of the TPS1 and TPS2 have failed, the process will advance to step A300 and the limp home process will be performed. If not so (i.e., if only either of the TPS1 and TPS2 has failed), the process will advance to step A230 and the lean mode inhibiting process will be performed. The lean mode is established on the basis of high precise throttle control, so when TPS failure has occurred, there is a fear that in the lean mode, stable combustion will be degraded. To avoid the fear, the lean mode is inhibited.

On the other hand, if neither of the throttle position sensors has failed, the process will advance to a position feedback failure judgment routine (POS F/B failure judgment routine) of step A240 via step A210.

In the position feedback failure judgment routine, position feedback failures, i.e., (1) valve system sticking failure (including fully closed sticking) and (2) motor output open failure are judged. This judgment is performed under the condition (zone) where (1) the ignition switch is on, (2) the relay motor is on, or communication abnormality from the ECU 16 to the throttle controller 160 has occurred, (3) the battery voltage Vb is equal to or greater than a predetermined value, and (4) no communication abnormality from the throttle controller 160 to the ECU 16 has occurred. When a position feedback failure signal is received, failure is judged.

If no position feedback failure is judged, the process will return via step A250 and the failure process will not be performed. If position feedback failure is judged, the process will advance to step A260 via step A250 and it will be judged whether or not a second throttle valve opening angle $V_{TPS2}$ is equal to or greater than a predetermined value K1 (K1: a value near the fully opened valve). If the second throttle valve opening angle $V_{TPS2}$ is equal to or greater than the predetermined value K1, the process will advance to step A280 and the opened-valve sticking failure process will be performed.

In step A260, if the second throttle valve opening angle $V_{TPS2}$ is not equal to or greater than the predetermined value K1, the process will advance to step A270 and it will be judged whether or not the second throttle valve opening angle $V_{TPS2}$ is equal to or less than a predetermined value K2 (K2: a value near the fully closed valve). If the second throttle valve opening angle $V_{TPS2}$ is equal to or less than the predetermined value K2, the process will advance to step A290 and the closed-valve sticking failure process will be performed.

If the second throttle valve opening angle $V_{TPS2}$ is a value between the predetermined values K1 and K2, the process will advance to step A300 and the limp home process will be performed.

Figure 5:
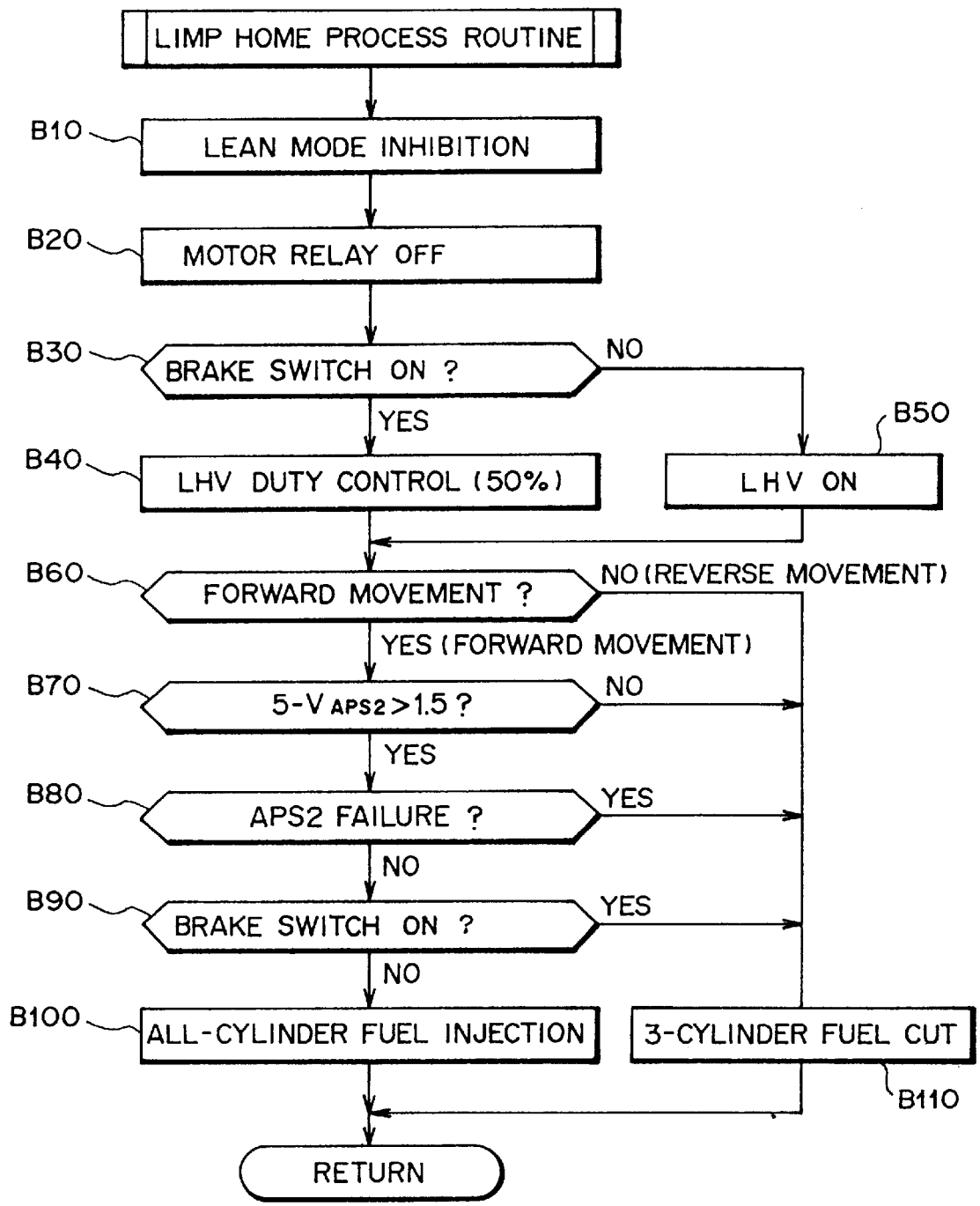
FIG. 5 is a flowchart showing a limp home process in the failure counter plan process of the intake control system of the internal combustion engine provided in a vehicle according to the embodiment of the present invention.

The limp home process of step A300 is performed as shown in FIG. 5.

In other words, the lean operating mode is inhibited (step B10). The lean operating mode requiring high precision throttle control is avoided, thereby performing more stable combustion in a stoichiometric mode.

Next, the motor relay (power supply relay) 62 is turned off (step B20). With this, power will not be supplied to the throttle controller 160, and the throttle valve control through the throttle controller 160 will not be performed. Consequently, an intake air volume is regulated only by controlling the limp home valve 12.

Then, it is judged whether or not the brake switch 200 is on, i.e., whether or not the braking operation has been performed (step B30). If the brake switch 200 is on, the duty control of the limp home valve (LHV) 12 will be performed by a predetermined time (e.g., 2 sec) (step B40).

In other words, this limp home valve 12 is an ON-OFF valve which is normally set to either an ON state or an OFF state and also is an electromagnetic valve, so duty control is also possible. In this embodiment, the volume of air flowing through the bypass passage 13 is suppressed by suppressing the opening angle of the LHV 12 at a duty ratio of about 50%, for example. In this manner, engine output is suppressed, thereby enhancing a braking effect.

Such duty control will be sufficient if it is performed for a predetermined time (here, 2 sec) after the start of the braking operation, so the duty control is completed after the predetermined time. Note that if the duty control of the limp home valve 12 is regulated to within a predetermined time, durability of the solenoid will also be ensured.

On the other hand, if the brake switch 200 is off, the LHV 12 will be caused to be in an ON (open) state (step B50).

After steps B40 and B50 have been performed, the process advances to step B60 and it is judged whether or not the vehicle is moving forward.

If the vehicle is not moving forward, it means the vehicle is moving in reverse and therefore the fuel cut to some cylinders (e.g., 3 cylinders of 6 cylinders) will be performed, thereby suppressing engine output (step B110). If the vehicle is moving forward, the process will advance to step B70 and it will be judged whether or not the output value of the second accel position sensor (APS2) 51B is equal to or greater than a predetermined value ((5 v-$V_{APS2}$) >1.5 v or (5 v-$V_{APS2}$)≦1.5 v).

When (5 v-$V_{APS2}$)≦1.5 v, the process advances to step B110 and the fuel cut to some cylinders (e.g., 3 cylinders of 6 cylinders) is performed, thereby suppressing engine output. Also, if (5 v-$V_{APS2}$)>1.5 v, the process will advance to step B80 and it will be judged whether or not the second accel position sensor (APS2) 51B has failed. This failure judgment is performed as described above.

If the APS2 has failed, the process will advance to step B110 and the fuel cut to some cylinders (e.g., 3 cylinders of 6 cylinders) will be performed, thereby suppressing engine output. If the APS2 has not failed, the process will advance to step B90 and it will be judged whether or not the brake switch 200 is on, i.e., whether the braking operation has been performed.

If the brake switch 200 is on, the fuel cut to some cylinders (e.g., 3 cylinders of 6 cylinders) will be performed, thereby suppressing engine output. If the brake switch 200 is not on, the process will advance to step B100, fuel will be injection into all cylinders, thereby ensuring output.

In addition, during the limp home process, the warning lamp 180 is also lit.

Thus, the limp home process is performed when the vehicle is moving forward and also in the case where there is no failure of the APS2 (i.e., a driver's intention to request speed can be grasped from APS2 information) and the accel opening angle is equal to or greater than a predetermined value without a braking operation. That is, when the driver is requesting engine output, fuel cut is not performed, but, during reverse travel, during APS2 failure, during a breaking operation, or when the accel opening angle is less than a predetermined value, the fuel cut to some cylinders (e.g., 3 cylinders of 6 cylinders) is performed as safety control, thereby suppressing engine output.

Therefore, the driver can obtain the speed of the vehicle if the braking operation is not being performed, and can also perform speed reduction or stopping if the braking operation is being performed. In addition, during a failure of the intake system, vehicle speed control reflecting a driver's intention can be performed at a certain level on the basis of braking operation information which is the remaining driver's intention reflection means.

Now, a description will be made of the opened-valve sticking failure process (step A280) and closed-valve sticking failure process (step A290) which are the features of the control apparatus for a vehicle according to the embodiment of the present invention.

First, in the opened-valve sticking failure process, the speed change regulation means 171A of the AT controller 171 performs a process of inhibiting the use of the 1st and 2nd speed gear stages as the low speed side gear stage among the speed change gear stages of the AT 170 in order to reduce a vehicle driving torque, and also performs a process of inhibiting the use of the 5th speed gear stage as the high speed gear stage in order to prevent a considerable reduction in a vehicle driving torque. In other words, the speed change regulation means 171A of the AT controller 171 performs a process of allowing the AT 170 to select the 3rd speed gear stage or 4th speed gear stage as the intermediate gear stage in order to prevent a considerable reduction in a vehicle driving torque, while reducing the vehicle driving torque.

Also, in the case where the driver moves the shift lever to the UP or DOWN range side indicated by "UP" and "DOWN" in FIG. 6 and thereby switches the AT controller 171 to the manual speed change mode, the speed change regulation means 171A of the AT controller 171 performs a process of allowing the selection of more speed change gear stages than the speed change gear stages allowed to be selected in the automatic speed change mode.

For example, when the selection of the 3rd speed gear stage is allowed in the automatic speed change mode, the speed change regulation means 171A of the AT controller 171 performs a process of allowing the selection of the speed change gear stage (2nd speed gear stage) lower by one stage than that or speed change gear stage (4th speed gear stage) higher by one stage than that. Also, when the selection of the 4th speed gear stage is allowed in the automatic speed change mode, the speed change regulation means 171A of the AT controller 171 performs a process of allowing the selection of the speed change gear stage (3rd speed gear stage) lower by one stage than that or speed change gear stage (5th speed gear stage) higher by one stage than that.

Also, in the closed-valve sticking failure process in step A290, the speed change regulation means 171A of the AT controller 171 performs a process of inhibiting the use of the 5th speed gear stage as the high speed gear stage among the speed change gear stages of the AT 170 in order to raise a vehicle driving torque, and also performs a process of inhibiting the use of the 1st and 2nd speed gear stages as the low speed side gear stage in order to prevent a considerable rise in a vehicle driving torque. In other words, the speed change regulation means 171A of the AT controller 171 performs a process of allowing the use of the 3rd speed gear stage or 4th speed gear stage as the intermediate gear stage in order to reduce a vehicle driving torque, while preventing a considerable reduction in the vehicle driving torque.

Also, in the case where the driver moves the shift lever to the UP or DOWN range side indicated by "UP" and "DOWN" in FIG. 6 and thereby switches the AT controller 171 to the manual speed change mode, the speed change regulation means 171A of the AT controller 171 performs a process of allowing the selection of more speed change stages than the speed change gear stages allowed to be selected in the automatic speed change mode, as described above.

Therefore, according to the control apparatus for a vehicle of this embodiment, in the case where the failure judgment means 70 judges that the throttle valve 15 has been stuck at an opening angle position equal to or greater than a first predetermined opening angle, the speed change regulation means 171A of the AT controller 171 inhibits the use of the low speed side gear stage. Therefore, a vehicle driving torque is reduced, and even in the case where the throttle valve 15 is stuck, there is an advantage of being able to ensure stable travel corresponding to a driver's request.

Also, in the case where the failure judgment means 70 judges that the throttle valve 15 has been stuck at an opening angle position equal to or greater than the first predetermined opening angle, the speed change regulation means 171A of the AT controller 171 inhibits the use of the high speed side gear stage. Therefore, a considerable reduction in a vehicle driving torque is prevented, and even in the case where the throttle valve 15 is stuck, there is an advantage of being able to ensure stable travel corresponding to a driver's request.

Also, in the case where the failure judgment means 70 judges that the throttle valve 15 has been stuck, the speed change regulation means 171A of the AT controller 171 performs a process of allowing the automatic transmission to select the intermediate speed gear stage. Therefore, a considerable reduction in a vehicle driving torque is prevented while reducing the vehicle driving torque, and even in the case where the throttle valve 15 is stuck, there is an advantage of being able to ensure stable travel corresponding to a driver's request.

In addition, the AT controller 171 allows the selection of more speed change gear stages when having a manual speed change mode. Therefore, there are advantages that a speed change gear stage can be selected by driver's speed change intention, more stable travel can be ensured, and particularly, when a vehicle is moved to a predetermined place (during limp home), traveling performance can be stabilized.

In the case where the failure judgment means 70 judges that the throttle valve 15 has been stuck at an opening angle position (small opening angle state) equal to or less than a second predetermined opening angle, the speed change regulation means 171A of the AT controller 171 inhibits the use of the high speed side gear stage. Therefore, a vehicle driving torque is raised, and even in the case where the throttle valve 15 is stuck, there is an advantage that stable travel corresponding to a driver's request can be ensured.

Also, in the case where the failure judgment means 70 judges that the throttle valve 15 has been stuck at an opening angle position (small opening angle state) equal to or less than the second predetermined opening angle, the speed change regulation means 171A of the AT controller 171 inhibits the use of the low speed side gear stage. Therefore, a considerable rise in a vehicle driving torque is prevented, and even in the case where the throttle valve 15 is stuck, there is an advantage that stable travel corresponding to a driver's request can be ensured.

In the control apparatus for a vehicle of the embodiment of the present invention, when the failure judgment means 70 judges the opened-valve sticking in which the throttle value 15 is stuck at an opening angle position equal to or greater than the first predetermined opening angle, the speed change regulation means 171A of the AT controller 171 performs the open sticking corresponding process (opened-valve sticking failure process). On the other hand, when the failure judgment means 70 judges the closed-valve sticking in which the throttle value 15 is stuck at an opening angle position equal to or less than the second predetermined opening angle, the speed change regulation means 171A of the AT controller 171 performs the closed sticking corresponding process (closed-valve sticking failure process). However, only either one or the other of the processes may be performed.

In other words, only in the case where the failure judgment means 70 judges the opened-valve sticking in which the throttle value 15 is stuck at an opening angle position equal to or greater than a predetermined opening angle (corresponding to the first predetermined opening angle), the speed change regulation means 171A of the AT controller 171 may perform the open sticking corresponding process (opened-valve sticking failure process). Conversely, only in the case where the failure judgment means 70 judges the closed-valve sticking in which the throttle value 15 is stuck at an opening angle position equal to or less than a predetermined opening angle (second predetermined opening angle), the speed change regulation means 171A of the AT controller 171 may perform the closed sticking corresponding process (closed-valve sticking failure process).

In this case, as with the above-mentioned embodiment, in the open sticking corresponding process and closed sticking corresponding process by the speed change regulation means 171A of the AT controller 171, a process of allowing the AT 170 to select the intermediate speed gear stage in the automatic speed change mode is also performed.

In the control apparatus for the vehicle of the embodiment of the present invention, in the open sticking corresponding process (opened-valve sticking failure process) by the speed change regulation means 171A of the AT controller 171 in the case where opened-valve sticking is judged by the failure judgment means 70 and also in the closed sticking corresponding process (closed-valve sticking failure process) by the speed change regulation means 171A of the AT controller 171 in the case where closed-valve sticking is judged by the failure judgment means 70, although the process of allowing the AT 170 to select the intermediate speed gear stage in the automatic speed change mode is performed, the present invention is not limited to this process. Not only in the case where the opened-valve sticking or closed-valve sticking is judged by the failure judgment means 70 but also in the case where failure due to sticking of the throttle valve 15 is judged, the process of allowing the AT 170 to select the intermediate speed gear stage in the automatic speed change mode may be performed by the speed change regulation means 171A of the AT controller 171.

Also, in the control apparatus for the vehicle of the embodiment of the present invention, in the case where the AT controller 171 has selected the intermediate speed side gear stage in the automatic speed change mode by the speed change regulation means 171A of the AT controller 171, if the AT controller 171 is switched to the manual speed change mode, the speed change regulation means 171A of the AT controller 171 changes the range of the intermediate speed side gear stage toward the low speed side or high speed side by at least one stage and selects the changed intermediate speed side gear stage. However, the present invention is not limited to this. The speed change regulation means 171A of the AT controller 171 may change the range of the intermediate speed side gear stage toward the high speed side and low speed side by at least one stage and select the changed intermediate speed side gear stage.

In addition, the speed change regulation means 171A of the AT controller 171 may be constituted so that in accordance with conditions, it changes the range of the intermediate speed side gear stage toward the high speed side or low speed side by at least one stage and selects the changed intermediate speed side gear stage, or so that it changes the range of the intermediate speed side gear stage toward the high speed side and low speed side by at least one stage and selects the changed intermediate speed side gear stage.

In the control apparatus for the vehicle of the embodiment of the present invention, in the open sticking corresponding process (opened-valve sticking failure process) by the speed change regulation means 171A of the AT controller 171 in the case where opened-valve sticking is judged and also in the closed sticking corresponding process (closed-valve sticking failure process) by the speed change regulation means 171A of the AT controller 171 in the case where closed-valve sticking is judged, although the process of allowing the AT 170 to select the intermediate speed gear stage in the automatic speed change mode is performed, a process of locking the AT 170 to the intermediate speed gear stage in the automatic speed change mode may be performed so that control can be simplified and also the capacity of a computer can be reduced.

In the control apparatus for the vehicle of the embodiment of the present invention, although the drivers operates the shift lever and thereby switches the automatic speed change mode or the manual speed change mode in the AT controller 171, the present invention may be constituted so that it is provided with only the automatic speed change mode without the manual speed change mode.

In the control apparatus for the vehicle of the embodiment of the present invention, while the transmission is a five speed automatic transmission, the present invention is not limited to this. The transmission may be other automatic transmissions (e.g., an automatic transmission with more speed change gear stages).

In this case, the low speed side gear stage includes at least the lowest speed change gear stage (e.g., 1st speed gear stage) among speed change gear stages and is constituted by a plurality of gear stages from the lowest speed change gear stage to a predetermined gear stage toward the high speed side. The high speed side gear stage includes at least the highest speed change gear stage (e.g., 5th speed gear stage) among speed change gear stages and is constituted by a plurality of gear stages from the highest speed change gear stage to a predetermined gear stage toward the low speed side. The intermediate speed gear stage is constituted by the gear stages between the low speed side gear stage and the high speed side gear stage.

Also, in the control apparatus for the vehicle of the embodiment of the present invention, in the case where opened-valve sticking is judged, although the process of inhibiting the use of the low speed gear stage in the automatic speed change mode is performed as the open sticking corresponding process (opened-valve sticking failure process) by the speed change regulation means 171A of the AT controller 171, the present invention is not limited to this process. In addition to this process, a process of reducing a quantity of injection fuel into some cylinders (which includes a fuel injection quantity cutting process) may be performed in order to achieve an even further reduction in engine output.

In addition, in the control apparatus for the vehicle of the embodiment of the present invention, in the case where opened-valve sticking is judged, although the process of inhibiting the use of the low speed gear stage in the automatic speed change mode is performed as the open sticking corresponding process (opened-valve sticking failure process) by the speed change regulation means 171A of the AT controller 171, a process of switching an operating mode to the compression stroke injection mode included in the lean combustion mode may be further performed in order to achieve a reduction in engine output.

In this case, the compression stroke injection mode is required to accurately control an air-fuel ratio by accurately controlling an intake air volume and an injection fuel quantity in order to establish combustion. Also, in the case of opened-valve sticking, an air-fuel ratio is controlled primarily by the adjustment of a fuel injection quantity, so combustion becomes easily unstable and the driver easily receives a feeling of unrest. Therefore, in order to ensure more combustion stability and in order for the driver not to receive a feeling of unrest, it is preferable to perform control so that load to engine accessories not relevant to travel is reduced. For example, a load fluctuation by turning an air conditioner on and off has a great influence on engine output, so it is preferable to perform control so that the operation of the air conditioner is stopped in such a manner that unstable combustion is prevented and also a feeling of unrest due to a fluctuation in engine output is not given to the driver.

Also, if a brief description is made of reset conditions for failure judgment, the reset conditions are that the ignition key is turned off, the battery is turned off, etc. The aforementioned control is repeated during re-travel, and in the case where it is rejudged that the DBW is normal, a return to normal operation is made. At this time, if failure contents are stored in a computer as failure information, rechecking of the DBW system can be performed when the vehicle is checked.

While the control apparatus for the vehicle of the embodiment of the present invention has been described as a control apparatus which is provided in an in-cylinder injection internal combustion engine, the control apparatus is not limited to this but is also applicable as a control apparatus for an internal combustion engine which can select a lean combustion mode and the other modes (e.g., stoichiometric air-fuel ratio mode).

We claim:

1. A control apparatus for a vehicle equipped with electronic throttle control means for electrically driving a throttle valve by drive means and an automatic transmission having a plurality of speed change gear stages, comprising:

sticking judgment means for judging whether or not said throttle valve has been stuck; and speed change regulation means for inhibiting use of a predetermined gear stage among the speed change gear stages of said automatic transmission in the case where said throttle valve is judged to have been stuck by said sticking judgment means.

2. The control apparatus for a vehicle as set forth in claim 1, wherein said speed change regulation means inhibits use of a low speed side gear stage among the speed change gear stages of said automatic transmission in the case where said throttle valve is judged to have been stuck by said sticking judgment means.

3. The control apparatus for a vehicle as set forth in claim 2, wherein said low speed side gear stage includes at least the lowest speed change gear stage among said speed change gear stages and is constituted by a plurality of gear stages from said lowest speed change gear stage to a predetermined gear stage toward a high speed side.

4. The control apparatus for a vehicle as set forth in claim 3, wherein said speed change regulation means inhibits the use of said low speed side gear stage among the speed change gear stages of said automatic transmission in the case where said throttle valve is judged to have been stuck at an opening angle position equal to or greater than a first predetermined opening angle by said sticking judgment means.

5. The control apparatus for a vehicle as set forth in claim 3, wherein said speed change regulation means inhibits the use of said low speed side gear stage among the speed change gear stages of said automatic transmission in the case where said throttle valve is judged to have been stuck at an opening angle position equal to or less than a predetermined opening angle by said sticking judgment means.

6. The control apparatus for a vehicle as set forth in claim 4, wherein said speed change regulation means inhibits the use of said low speed side gear stage among the speed change gear stages of said automatic transmission in the case where said throttle valve is judged to have been stuck at an opening angle position equal to or less than a second predetermined opening angle smaller than said first predetermined opening angle by said sticking judgment means.

7. The control apparatus for a vehicle as set forth in claim 1, wherein said speed change regulation means inhibits use of a high speed side gear stage among the speed change gear stages of said automatic transmission in the case where said throttle valve is judged to have been stuck by said sticking judgment means.

8. The control apparatus for a vehicle as set forth in claim 7, wherein said high speed side gear stage includes at least the highest speed change gear stage among said speed change gear stages and is constituted by a plurality of gear stages from said highest speed change gear stage to a predetermined gear stage toward a low speed side.

9. The control apparatus for a vehicle as set forth in claim 8, wherein said speed change regulation means inhibits the use of said high speed side gear stage among the speed change gear stages of said automatic transmission in the case where said throttle valve is judged to have been stuck at an opening angle position equal to or greater than a first predetermined opening angle by said sticking judgment means.

10. The control apparatus for a vehicle as set forth in claim 8, wherein said speed change regulation means inhibits the use of said high speed side gear stage among the speed change gear stages of said automatic transmission in the case where said throttle valve is judged to have been stuck at an opening angle position equal to or less than a predetermined opening angle by said sticking judgment means.

11. The control apparatus for a vehicle as set forth in claim 9, wherein said speed change regulation means inhibits the use of said high speed side gear stage among the speed change gear stages of said automatic transmission in the case where said throttle valve is judged to have been stuck at an opening angle position equal to or less than a second predetermined opening angle smaller than said first predetermined opening angle by said sticking judgment means.

12. The control apparatus for a vehicle as set forth in claim 3, further comprising:

automatic transmission control means switchable to both an automatic speed change mode which changes each speed change gear stage of said automatic transmission automatically and a manual speed change mode which selects each speed change gear stage of said automatic transmission manually;

wherein said speed change regulation means inhibits the use of said low speed side gear stage in the case where said automatic transmission control means is in said automatic speed change mode and wherein said speed change regulation means also changes a range of said low speed side gear stage toward the low speed side by at least one stage and inhibits use of the changed low speed side gear stage, in the case where said automatic transmission control means is in said manual speed change mode.

13. The control apparatus for a vehicle as set forth in claim 8, further comprising:

automatic transmission control means switchable to both an automatic speed change mode which changes each speed change gear stage of said automatic transmission automatically and a manual speed change mode which selects each speed change gear stage of said automatic transmission manually;

wherein said speed change regulation means inhibits the use of said high speed side gear stage in the case where said automatic transmission control means is in said automatic speed change mode and wherein said speed change regulation means also changes a range of said high speed side gear stage toward the high speed side by at least one stage and inhibits use of the changed high speed side gear stage, in the case where said automatic transmission control means is in said manual speed change mode.

14. A control apparatus for a vehicle equipped with electronic throttle control means for electrically driving a throttle valve by drive means and an automatic transmission having a plurality of speed change gear stages, comprising:

sticking judgment means for judging whether or not said throttle valve has been stuck; and speed change regulation means for selecting an intermediate speed gear stage among the speed change gear stages of said automatic transmission in the case where said throttle valve is judged to have been stuck by said sticking judgment means.

15. The control apparatus for a vehicle as set forth in claim 14, wherein said intermediate speed gear stage is constituted by the gear stages between a low speed side gear stage and a high speed side gear stage, the low speed side gear stage including at least the lowest speed change gear stage among said speed change gear stages and also being constituted by a plurality of gear stages from said lowest speed change gear stage to a predetermined gear stage toward a high speed side, and the high speed side gear stage including at least the highest speed change gear stage among said speed change gear stages and also being constituted by a plurality of gear stages from said highest speed change gear stage to a predetermined gear stage toward a low speed side.

16. The control apparatus for a vehicle as set forth in claim 15, wherein said speed change regulation means selects said intermediate speed gear stage among the speed change gear stages of said automatic transmission in the case where said throttle valve is judged to have been stuck at an opening angle position equal to or greater than a first predetermined opening angle by said sticking judgment means.

17. The control apparatus for a vehicle as set forth in claim 15, wherein said speed change regulation means selects said intermediate speed gear stage among the speed change gear stages of said automatic transmission in the case where said throttle valve is judged to have been stuck at an opening angle position equal to or less than a predetermined opening angle by said sticking judgment means.

18. The control apparatus for a vehicle as set forth in claim 16, wherein said speed change regulation means selects said intermediate speed gear stage among the speed change gear stages of said automatic transmission in the case where said throttle valve is judged to have been stuck at an opening angle position equal to or less than a second predetermined opening angle smaller than said first predetermined opening angle by said sticking judgment means.

19. The control apparatus for a vehicle as set forth in claim 15, further comprising:

automatic transmission control means switchable to both an automatic speed change mode which changes each speed change gear stage of said automatic transmission automatically and a manual speed change mode which selects each speed change gear stage of said automatic transmission manually;

wherein said speed change regulation means selects said intermediate speed gear stage in the case where said automatic transmission control means is in said automatic speed change mode and wherein said speed change regulation means also changes a range of said intermediate speed gear stage toward the high speed side by at least one stage and selects the changed intermediate speed gear stage, in the case where said automatic transmission control means is in said manual speed change mode.

20. The control apparatus for a vehicle as set forth in claim 15, further comprising:

automatic transmission control means switchable to both an automatic speed change mode which changes each speed change gear stage of said automatic transmission automatically and a manual speed change mode which selects each speed change gear stage of said automatic transmission manually;

wherein said speed change regulation means selects said intermediate speed gear stage in the case where said automatic transmission control means is in said automatic speed change mode and wherein said speed change regulation means also changes a range of said intermediate speed gear stage toward the low speed side by at least one stage and selects the changed intermediate speed gear stage, in the case where said automatic transmission control means is in said manual speed change mode.

21. The control apparatus for a vehicle as set forth in claim 15, further comprising:

automatic transmission control means switchable to both an automatic speed change mode which changes each speed change gear stage of said automatic transmission automatically and a manual speed change mode which selects each speed change gear stage of said automatic transmission manually;

wherein said speed change regulation means selects said intermediate speed gear stage in the case where said automatic transmission control means is in said automatic speed change mode and wherein said speed change regulation means also changes a range of said intermediate speed gear stage toward the low speed side and/or the high speed side by at least one stage and selects the changed intermediate speed gear stage, in the case where said automatic transmission control means is in said manual speed change mode.

* * * * *